(12) United States Patent
Kojima et al.

(10) Patent No.: US 7,418,397 B2
(45) Date of Patent: Aug. 26, 2008

(54) WITNESS SYSTEM

(75) Inventors: Hajime Kojima, Kanagawa (JP);
Toshihiko Kaji, Kanagawa (JP);
Yasuharu Ito, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/184,587

(22) Filed: Nov. 3, 1998

(65) Prior Publication Data

US 2003/0078862 A1 Apr. 24, 2003

(30) Foreign Application Priority Data

Apr. 30, 1998 (JP) ................... 10-121295

(51) Int. Cl.
*G06Q 10/00* (2006.01)
*G06Q 40/00* (2006.01)
*H04K 1/00* (2006.01)
*H04L 9/00* (2006.01)

(52) U.S. Cl. ................. 705/1; 705/44; 705/64
(58) Field of Classification Search ........ None
See application file for complete search history.

(56) References Cited

U.S. PATENT DOCUMENTS

| | | | | |
|---|---|---|---|---|
| 5,191,613 A | * | 3/1993 | Graziano et al. | 713/176 |
| 5,732,400 A | * | 3/1998 | Mandler et al. | 705/26 |
| 5,794,207 A | * | 8/1998 | Walker et al. | 705/23 |
| 5,909,492 A | * | 6/1999 | Payne et al. | 705/78 |
| 5,970,475 A | * | 10/1999 | Barnes et al. | 705/27 |
| 6,049,787 A | * | 4/2000 | Takahashi et al. | 705/44 |

OTHER PUBLICATIONS

Messmer, Ellen, "Is EDI Legal? (legal issues surrounding Electronic Data Interchange)", Information Executive, vol. 3, No. 1, p. 16, 1990.*
"the impact of EDI" by Stephen P. Kaufman, Electronic Buyers' News n 654, 15; pub. Date Jun. 12, 1989.*
H. Kojima, "Electronic Noatry for Internet Banking Transaction", Proceedigs Track 12, CALS Expos International 1997, Tokyo, Nov. 4, 1997.
Hiroyuki Sakuma, "Time for Getting Away From Storing Everything Printed on Paper," Net PC, ASCII Co., Tokyo, JP, vol. 2, No. 8, Aug. 1997, pp. 154-155.

(Continued)

*Primary Examiner*—F. Zeender
*Assistant Examiner*—Mussa Shaawat
(74) *Attorney, Agent, or Firm*—Staas & Halsey LLP

(57) ABSTRACT

A witness system using EDI (electronic data interchange) to perform efficient distribution and account settlement processes between selling and buying companies. A buying company makes documents according to delivery or order vouchers, and electronically sends the documents to a selling company via a notarization authority. The selling company compares the authentication documents with delivery or order vouchers the selling company issued, and, after determining that the documents are correct executes a confirmation response to the notarization authority. The notarization authority registers the documents in the witness server's receipts detail table and notifies the buying and selling companies that the notarization authority authenticated the documents. This structure enables the making of accurate detailed payment statements when, for example, a detailed payment statement is made or a funds transfer is executed based on confirmed data. Furthermore, checking the detailed payment statement is made simpler through reference to the witness system server.

24 Claims, 52 Drawing Sheets

OTHER PUBLICATIONS

Notice of Grounds of Rejection for corresponding Japanese Application No. 10-121295, mailed Jan. 13, 2004.
Summary of Digital Notary (No. 2), Domestic/Overseas Trends by Digital Notary Study WG, ECOM, Aug. 20, 1997.
"5M-9 Development Verification Experiment of Digital Notary System" by Takehiro Okoshi, Mitsubishi Electric Corp., The 55th National Conference of The Institute of Electronics, Information and Communication Engineers, Sep. 26, 1997, p. 4-461.

Notice of Grounds of Rejection for Related Application No. 10-121295 mailed Feb. 18, 2003.
Summary of Digital Notary (No. 2), Domestic/Overseas Trends by Digital Notary Study WG, ECOM, Aug. 20, 1997.
"5M-9 Development and Verification Experiment of Digital Notary System" by Takehiro Okoshi, Mitsubishi Electric Corp., The 55th National Conference of The Institute of Electronics, Information and Communication Engineers, Sep. 26, 1997, p. 4-461.

* cited by examiner

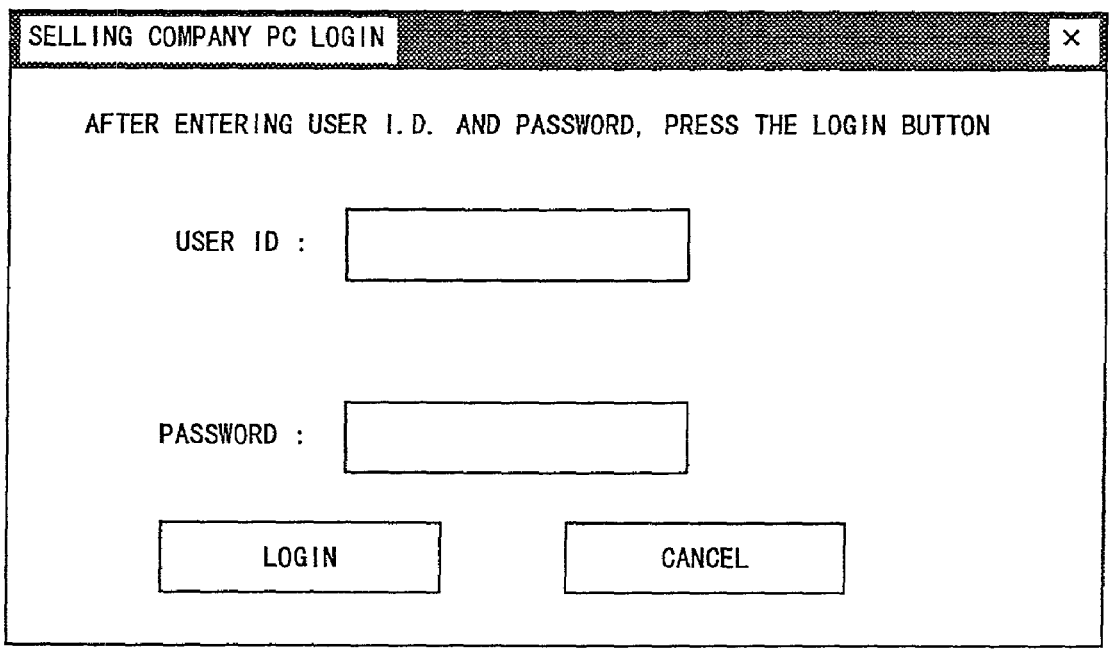
F I G. 6

QUIT(X)

QUIT SYSTEM(X)

F I G. 8

DATA CONFIRMATION SCREEN

DATA CONFIRMATION (DETAILS)

CUSTOMER : 660134          DATE : 1997/11/20

VOUCHER NO : S111111       CLASSIFICATION : ORDERS

| COMMODITY BRAND NAME | QUANTITY | UNIT COST | TOTAL COST |
|---|---|---|---|
|  | 10 | 100 | 1,000 |
|  |  |  |  |
|  |  |  |  |
|  |  |  |  |

TOTAL              10          100 YEN        1000 YEN

41a ⤳ CONFIRMATION OK    41b ⤳ CONFIRMATION NG    QUIT

F I G. 1 4

CONFIRMED DATA LIST SCREEN

CONFIRMED DATA LIST

SEARCH CONDITIONS

CUSTOMER: [_____] ▶    VOUCHER DATE: (FROM) 1997 / 12 / 05
                                            (TO)   1997 / 12 / 05

CLASSIFICATION:
- ◉ WHOLESALE (STOCK)
- ○ ACCOUNTS RECEIVABLE
- ○ SETOFF
- ○ PAYMENT CORRECTION
- ○ ORDERS
- ○ CONTRACTS

| VOUCHER DATE | VOUCHER NUMBER | MONEY AMOUNT (BY TYPE) |
|---|---|---|
| | | |
| | | |
| | | |
| | | |

[SEARCH]    [DETAILS] 45a    [QUIT]

CONFIRMED DATA DETAIL SCREEN

CONFIRMATION DATA DETAILS

CUSTOMER : 660134  DATE : 1997/11/20

VOUCHER NO : s111111  CLASSIFICATION : ORDERS

| COMMODITY | QUANTITY | UNIT COST | TOTAL COST |
|---|---|---|---|
| BRAND NAME | 10 | 100 | 1,000 |
|  |  |  |  |
|  |  |  |  |
|  |  |  |  |

TOTAL  10  100 YEN  1000 YEN

[QUIT]

PAYMENT LIST SCREEN

PAYMENT LIST

SEARCH TERMS

PAYOR : ▓▓▓▓▓▓ ○○ FOODS COMPANY ▼

PAYEE : 660134 (Ltd) □□ ▼

CLOSING DATE : 1997 / 12 / 03       PAYMENT DATE : / /

PAYMENT COMMITMENT :

| DELIVERY DATE | VOUCHER NO. | STORE | WHOLESALE (STOCK) MONEY AMOUNT | DISCOUNT |
|---|---|---|---|---|
| | | | | |
| | | | | |
| | | | | |
| | | | | |

WHOLESALE (STOCK) TOTAL :             YEN         TOTAL WITH TAX :                    YEN

BALANCE CARRIED FORWARD:              YEN         PAYMENT MONEY AMOUNT :              YEN
AMOUNT DUE THIS PERIOD :              YEN         REMITTANCE FEE :                    YEN
CORRECTED MONEY AMOUNT :                          PAYMENT MONEY AMOUNT FOR
                                                  THIS PERIOD :

[SEARCH]          [DETAILS] 44a          [QUIT]

F I G. 1 8

DETAIL DISPLAY SCREEN

SEARCH TERMS

PAYEE     : 660134 (Ltd) △△△
DATE      : 1997/08/12
VOUCHER NO. : 0970801

| COMMODITY | UNIT WEIGHT | QUANTITY | UNIT COST | TOTAL COST | DISCOUNT |
|---|---|---|---|---|---|
| 1234567890123456789 0 | 222,222 | 999,999,999 | 44,444,444 | 6,666,666,666 | |
| 1234567890123456789 0 | 222,222 | 999,999,999 | 44,444,444 | 6,666,666,666 | |
| 1234567890123456789 0 | 222,222 | 999,999,999 | 44,444,444 | 6,666,666,666 | |
| 1234567890123456789 0 | 222,222 | 999,999,999 | 44,444,444 | 6,666,666,666 | |
| 1234567890123456789 0 | 222,222 | 999,999,999 | 44,444,444 | 6,666,666,666 | |
| 1234567890123456789 0 | 222,222 | 999,999,999 | 44,444,444 | 6,666,666,666 | |

TOTAL      5,999,999,994    266,666,664 YEN    9,999,999,996 YEN

REBATE 9,999,999,994 YEN      CONSUMPTION TAX 444,444,444,445 YEN

[ QUIT ]

F I G.  1 9

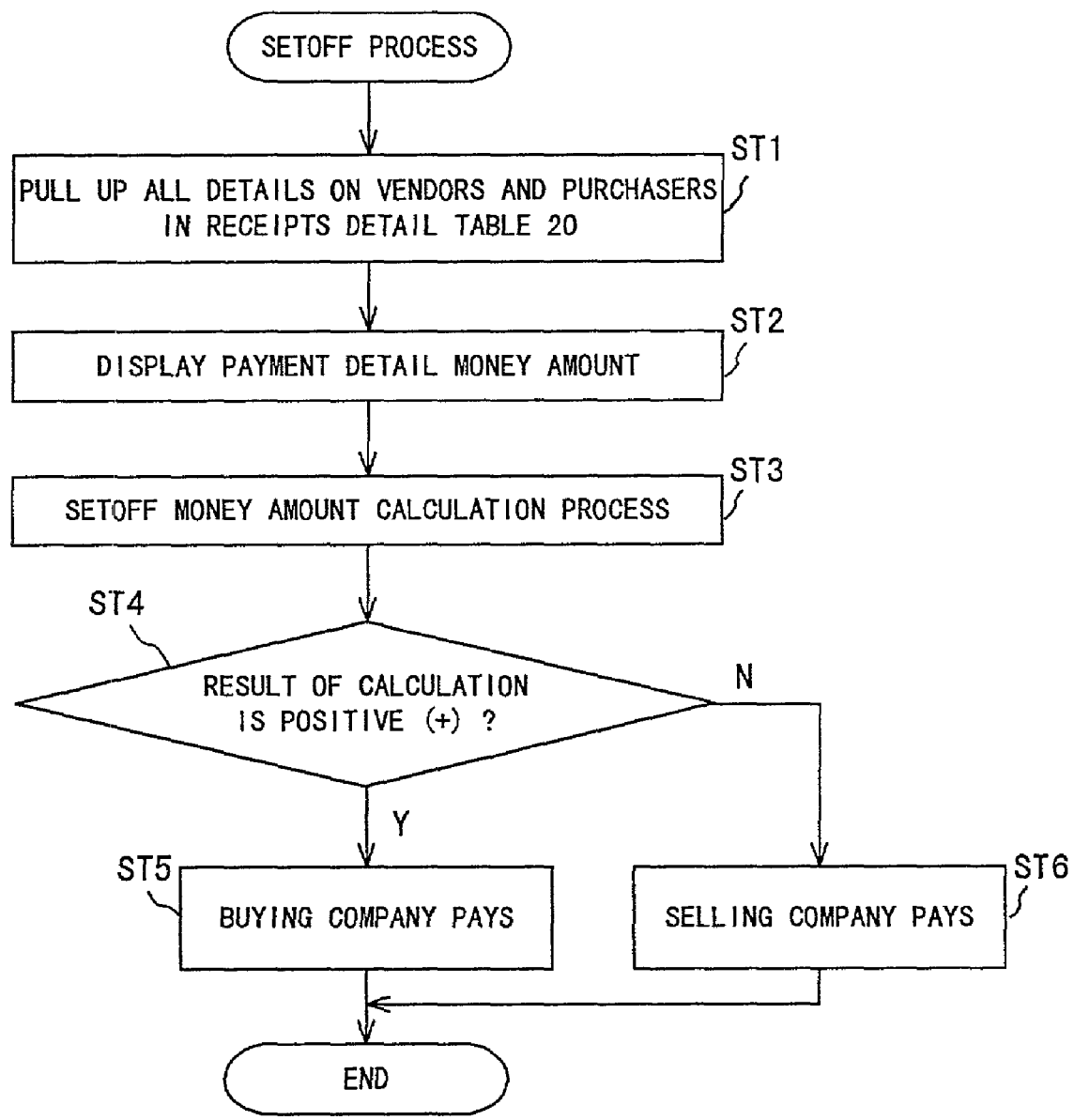
F I G. 2 3

COMPANY CERTIFICATE ACQUISITION SCREEN

COMPANY CERTIFICATE ACQUISITION

APPLICATION DATA (A)
  COMPANY REGISTRATION ID :
  AUTHENTICATION AUTHORITY URL :
  NAME OF PROXY SERVER :

CERTIFICATE TYPE : ◉ SIGNATURE ○ ENCODING

---

SIGNATURE CERTIFICATE    ISSUED

ISSUED DATE : 1997 / 08 / 25
  CERTIFICATE NUMBER: 100
  EXPIRATION : BEFORE 1997 / 08 / 25

APPLICATION STATUS CONFIRMATION

ENCODING CERTIFICATE    ISSUED

ISSUED DATE : 1997 / 08 /12
  CERTIFICATE NUMBER: 200
  EXPIRATION : BEFORE 1997 / 08 / 12

APPLICATION STATUS CONFIRMATION

---

APPLICATION FOR CERTIFICATE  12a

QUIT  12b

F I G. 3 0

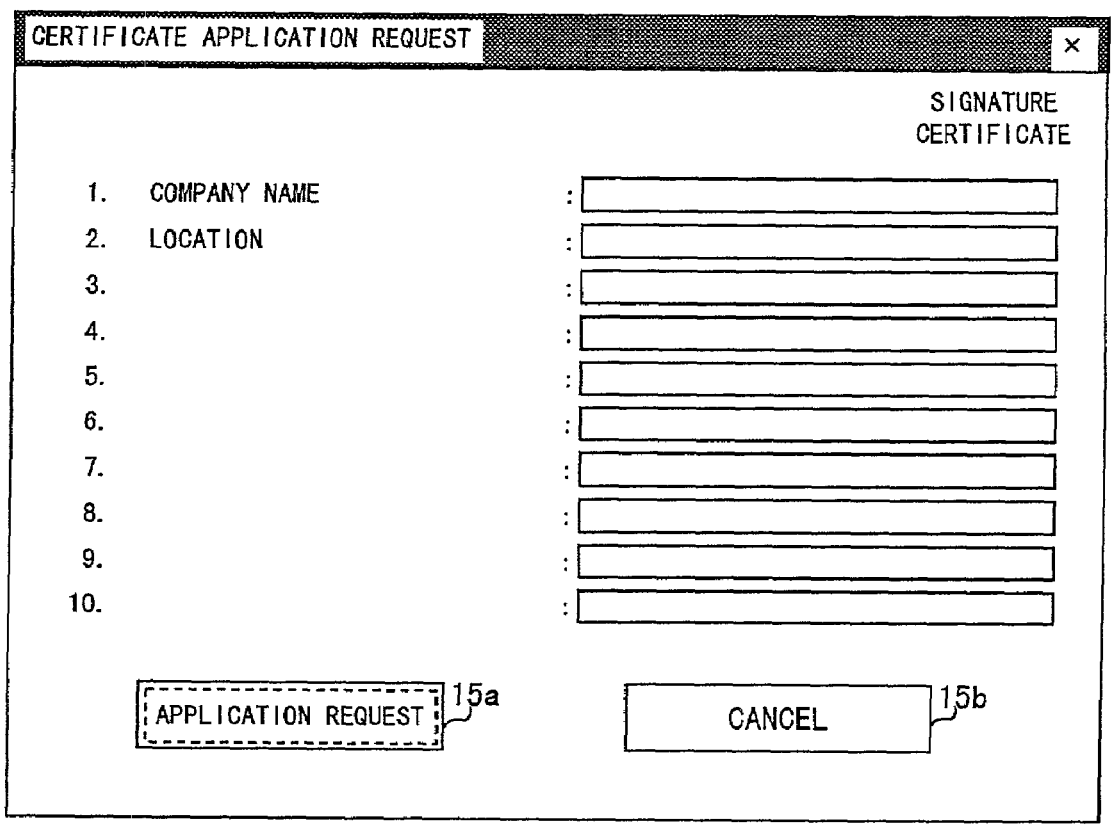
F I G. 33

COMPANY REGISTRATION SCREEN

COMPANY REGISTRATION

NOTARIZATION AUTHORITY URL :
NAME OF PROXY SERVER :          (MAY BE ABBREVIATED)
WITNESS ID :

COMPANY REGISTRATION

COMPANY ID :

COMPANY REGISTRATION
DATA FILE NAME :          (MAY BE ABBREVIATED)

REGISTRATION STATUS
CONFIRMATION

REGISTRATION — 16a

QUIT — 16b

F I G. 3 4

COMPANY REGISTRATION REQUEST SCREEN

| COMPANY REGISTRATION REQUEST | ☒ |
|---|---|

1. LOCATION :
2. COMPANY NAME :
3. :
4. :
5. :
6. :
7. :
8. :
9. :
10. :

| WITNESS APPLICATION DATA EDITING | REGISTRATION REQUEST 18a | CANCEL 18b |

FIG. 36

COMPANY LIST SCREEN

COMPANY LIST

LIST OF COMPANIES PRESENTLY REGISTERED WITH THE NOTARIZATION AUTHORITY

| COMMODITY ID | COMPANY NAME | REGISTRATION DATE |
|---|---|---|
| 00000000000000001 | (Ltd)○○ FOODS COMPANY | 1997/09/22 20:41 |
| 00000000000000002 | ×× HAM COMPANY (Ltd) | 1997/10/22 09:21 |
| 00000000000000005 | (Ltd)□□ | 1997/12/01 21:21 |
| | | |
| | | |
| | | |
| | | |
| | | |

DETAILED INFORMATION  19a

LIST INQUIRY                    QUIT

FIG. 37

COMPANY DETAILED INFORMATION SCREEN

COMPANY DETAILED INFORMATION

COMPANY ID      : 00000000000000000005
COMPANY NAME    : (Ltd) □□
LOCATION        : HOKKAIDO XXX CITY YYY 9-999

SIGNATURE CERTIFICATE INFORMATION:

ISSUED DATE         : 1997 / 11 / 09
　　CERTIFICATE NUMBER  : 20
　　EXPIRATION          : BEFORE 1998 / 05 / 10

ENCODING CERTIFICATE INFORMATION:

ISSUED DATE         : 1997 / 11 / 09
　　CERTIFICATE NUMBER  : 21
　　EXPIRATION          : BEFORE 1998 / 05 / 10

QUIT

FIG. 38

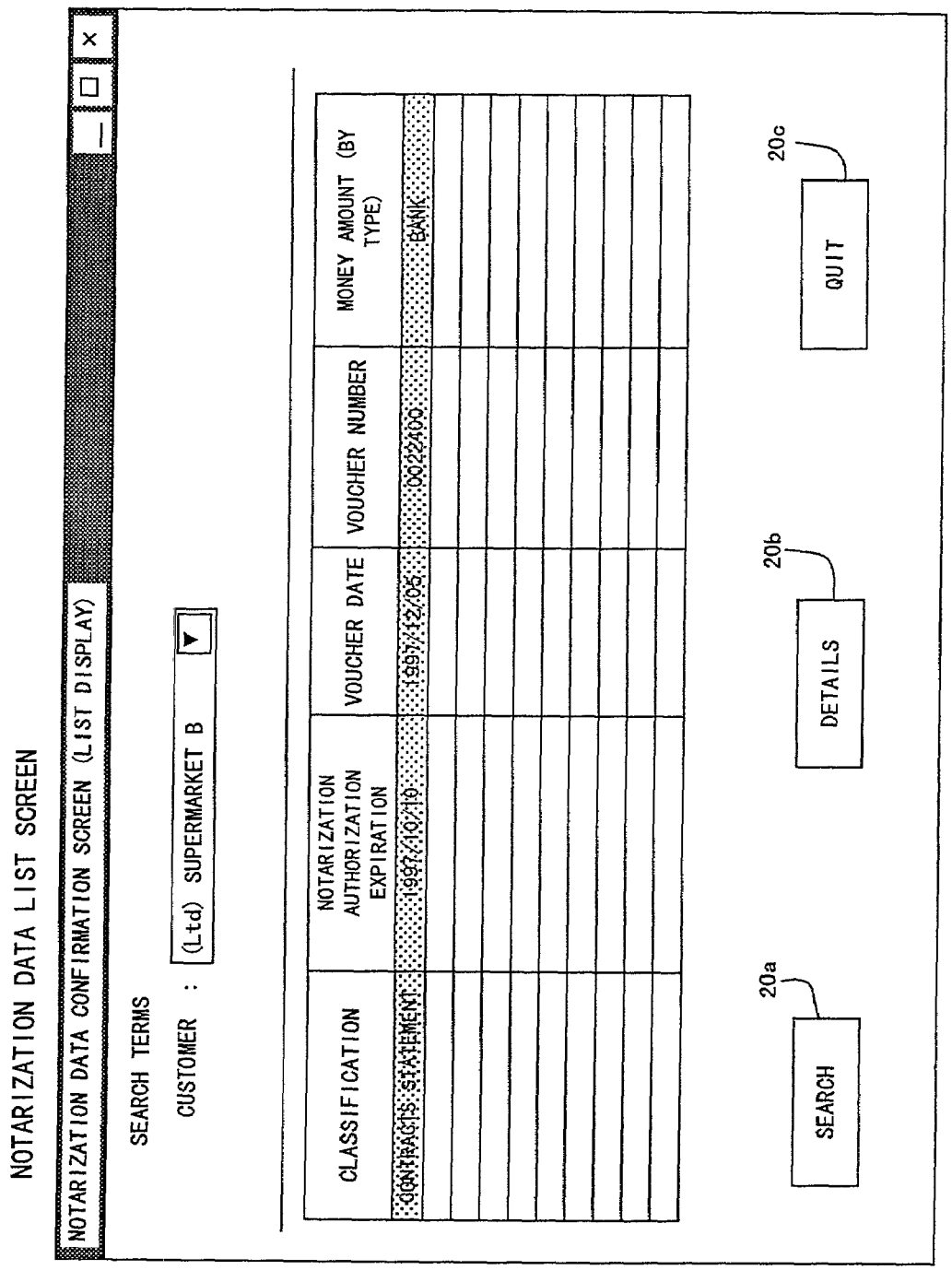
F I G. 42

NOTARIZATION DATA CONFIRMATION SCREEN

NOTARIZATION DATA CONFIRMATION (DETAILS)

CUSTOMER : 660134      DATE : 1997/11/20

VOUCHER NO : S111111      CLASSIFICATION : ORDERS

| COMMODITY BRAND NAME | QUANTITY | UNIT COST | TOTAL COST |
|---|---|---|---|
| | 10 | 100 | 1,000 |
| | | | |
| | | | |
| | | | |
| | | | |

TOTAL      10      100 YEN      1000 YEN

21a — CONFIRMATION OK      21b — CONFIRMATION NG      QUIT

F I G. 4 3

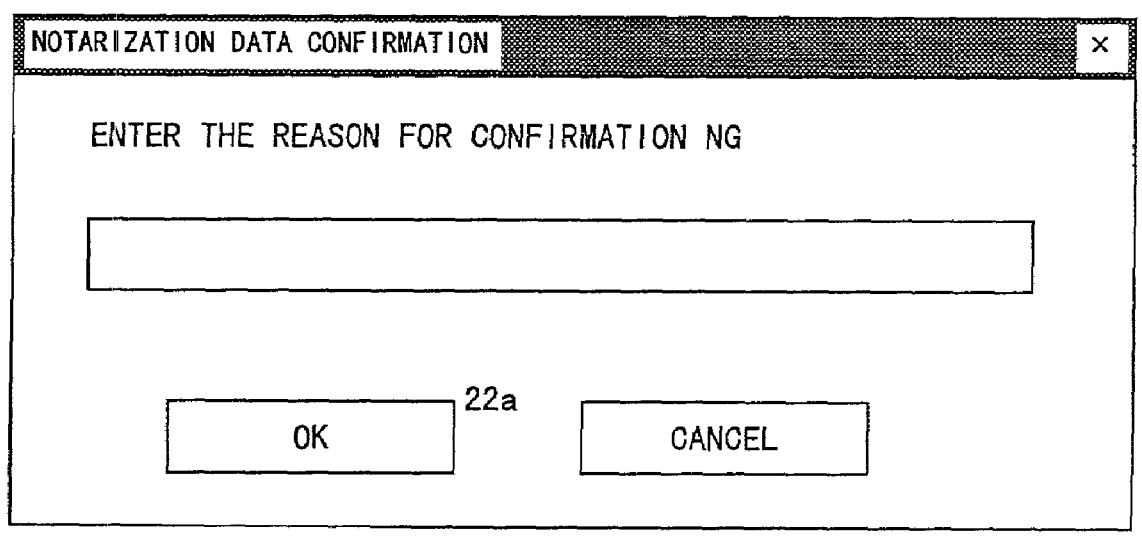
F I G. 4 4

NOTARIZED DATA LIST SCREEN

NOTARIZED DATA LIST

SEARCH TERMS

CUSTOMER : [AAA CO., LTD. COMPANY] ▼     VOUCHER DATE : (FROM) 1997 / 12 / 05   (TO) 1997 / 12 / 05

CLASSIFICATION :
- ◉ WHOLESALE (STOCK)
- ○ ACCOUNTS RECEIVABLE
- ○ SETOFF
- ○ PAYMENT CORRECTION
- ○ ORDERS
- ○ CONTRACTS

| VOUCHER DATE | VOUCHER NUMBER | MONEY AMOUNT (BY TYPE) |
|---|---|---|
|  |  |  |

SEARCH     DETAILS (25a)     QUIT

F I G. 45

NOTARIZED DATA DETAIL SCREEN

NOTARIZED DATA DETAIL

CUSTOMER : 660134          DATE : 1997/11/20

VOUCHER NO : s111111       CLASSIFICATION : ORDERS

| COMMODITY | QUANTITY | UNIT COST | TOTAL COST |
|---|---|---|---|
| BRAND NAME | 10 | 100 | 1,000 |

TOTAL                10            100 YEN        1000 YEN

[QUIT]

F I G. 46

PAYMENT LIST SCREEN

PAYMENT LIST

SEARCH TERMS

PAYOR : [COMPANY]
PAYEE : 660134 (Ltd) ☐ ▶  PAYMENT DATE : / /
CLOSING DATE : 1997 / 12 / 03 ☐
                                              PAYMENT COMMITMENT :

| DELIVERY DATE | VOUCHER NO. | STORE | WHOLESALE (STOCK) MONEY AMOUNT | DISCOUNT |
|---|---|---|---|---|
| | | | | |
| | | | | |
| | | | | |
| | | | | |
| | | | | |
| | | | | |
| | | | | |
| | | | | |

WHOLESALE
(STOCK) TOTAL :           YEN                TOTAL WITH TAX :            YEN
BALANCE CARRIED FORWARD:  YEN                PAYMENT MONEY AMOUNT :      YEN
AMOUNT DUE THIS PERIOD :  YEN                REMITTANCE FEE :            YEN
CORRECTED MONEY AMOUNT :  YEN                PAYMENT MONEY AMOUNT FOR
                                             THIS PERIOD :

SEARCH          DETAILS          QUIT
                   24a

F I G. 4 7

DETAIL DISPLAY SCREEN

SEARCH TERMS

PAYEE : 660134 (Ltd) ○○ FOODS COMPANY
DATE : 1997/08/12
VOUCHER NO. : 09770801

| COMMODITY | UNIT WEIGHT | QUANTITY | UNIT COST | TOTAL COST | DISCOUNT |
|---|---|---|---|---|---|
| 12345678901234567890 | 222,222 | 999,999,999 | 44,444,444 | 6,666,666,666 | |
| 12345678901234567890 | 222,222 | 999,999,999 | 44,444,444 | 6,666,666,666 | |
| 12345678901234567890 | 222,222 | 999,999,999 | 44,444,444 | 6,666,666,666 | |
| 12345678901234567890 | 222,222 | 999,999,999 | 44,444,444 | 6,666,666,666 | |
| 12345678901234567890 | 222,222 | 999,999,999 | 44,444,444 | 6,666,666,666 | |
| 12345678901234567890 | 222,222 | 999,999,999 | 44,444,444 | 6,666,666,666 | |

TOTAL     5,999,999,994     266,666,664 YEN     9,999,999,996 YEN

REBATE 9,999,999,994 YEN     CONSUMPTION TAX 444,444,444,445 YEN

QUIT

F I G. 48

WITNESS SYSTEM

BACKGROUND OF THE INVENTION

1. Field of the Invention

The present invention relates to a Witness system that, using EDI (electronic data exchange), supports account settlement (accounting) and distribution systems among sellers and buyers.

2. Description of the Related Art

Today's distribution systems are manifold and, through complex distribution media, carry out the distribution of large quantities of goods. As a result, accounting processes undertaken between sellers and buyers are equally complex.

The system disclosed in FIG. 1 is representative of conventional account settlement (accounting) systems. First, with each delivery of goods, a buyer examines a delivery voucher sent—or tendered contemporaneously on site—by a seller. Using, illustratively, an internal system in the buying company, the buyer then reduces the details to voucher form, upon which payment to the seller is to be based. This detailed voucher discloses, among other information, seller's name, delivery date, description of goods delivered, unit price, quantity, and total price.

The buyer thereafter consolidates and aggregates detailed vouchers according, illustratively, to payment date, and makes a detailed payment statement. The detailed payment statement so made is the result of the above-described consolidation and aggregation of each detailed voucher. Minute details otherwise recorded in a detailed voucher are omitted from the detailed payment statement. By way of illustration, payment date and total price are reflected in the detailed payment statement; more particularized details (e.g., delivery date, description of delivered items, unit price, and quantity), however, are commonly omitted.

As between a buyer and seller trading daily many goods with a payment cycle of one payment per month, for example, detailed vouchers corresponding to delivered volumes are reduced to a single detailed payment statement, and only the aggregated total price is established according to the detailed payment statement.

The buyer, using the above described detailed payment statement, requests that its bank transfer funds in favor of the seller. The bank then makes a deposit for the amount specified in the detailed payment statement in favor of the Seller, with respect to whom the request for funds transfer was made, utilizing, illustratively, an inter-bank exchange system. As a result, a seller thus receiving payment learns, through notification from the bank, the amount of money received in the seller's bank account from the buyer.

The following problems are inherent in a conventional system like that described above. Specifically, the detailed payment statement used in the conventional system is a document that compiles in the aforesaid manner multiple delivery vouchers in establishing a total payment amount. A seller is thus unable unilaterally to ascertain which delivery vouchers are reflected in the total amount paid to it by the buyer. This is the result of the omission of delivery date, description of delivered goods, unit price, quantity, and like information, for discrete transactions, from the detailed payment statement.

In such instances, the seller must confirm substantive details with the buyer, in order to verify the amount of money received. Where, for example, the amount of money paid to the seller does not agree with the total amount invoiced, the seller's accounting representative must either confirm with the buyer the contents of the detailed vouchers or make discrete inquiries regarding payment amounts. This work places a significant burden on the accounting departments and constitutes a material impediment to enhancing the efficiency of account settlement processing.

Specifically, where a single account settlement for a large transaction is undertaken according to the detailed payment statement, a great deal of time and human effort are required to confirm substantive details recorded therein. And, in settling accounts with high-volume customers, a seller must undertake account settlement in terms of the smallest transaction, i.e., by voucher, in order to set receivables off against payables.

On the other hand, with the popularization of the internet, the construction of EDI-implemented (electronic data interchange) information exchange systems is being tested in all functional disciplines. It is anticipated that use of the system contemplated by the present invention will, particularly as between companies, facilitate more efficient account settlement processing and distribution in complex distribution channels.

SUMMARY OF THE INVENTION

Utilizing EDI (electronic data interchange), the present invention provides a Witness system that ensures information safety, and further provides account settlement processes making use of said Witness system, in order to perform efficient account settlement processing and distribution.

Specifically, the present invention achieves these objectives by providing a Witness system consisting of: Document making means for making confirmation documents based on records prepared by and sent from a seller for each seller record; forwarding means for forwarding to a notarization authority documentation made according to said confirmation document making means and, further, for forwarding said documentation from the aforementioned notarization authority to the aforementioned seller; confirmation means for confirming whether the content of the aforementioned documents forwarded by the aforementioned forwarding means agree with the content of the aforementioned seller records; a Witness for confirming that the aforesaid documents are correct, upon establishing the aforesaid substantive agreement according to said confirmation means; and memory means for storing in memory documents confirmed by said Witness.

Records prepared by and sent from a seller include, by way of illustration, delivery vouchers, written estimates, invoices, and like records. These records are used to identify brand names, quantities, unit prices, and money amounts, when making details concerning goods received by a buyer. "Buyer" and "seller" comprise both public and private enterprises. The system contemplated by the present invention draws no distinction between incorporated and unincorporated entities.

A notarization authority (1) receives details prepared by a buyer based, among other things, on delivery vouchers, (2) transmits these details to the seller, and (3) solicits from the seller confirmation that substantive details are in agreement with the content of the delivery vouchers. The Witness receives notification that the seller confirms substantive agreement, whereupon the Witness certifies the aforesaid details as correct documents and confirms said details to the aforesaid buyer and seller.

By constructing the system in this way, details for discrete deliveries prepared by a buyer are confirmed between buyer and seller, as well as by the third-party Witness. These details can be used effectively as accurate data in account settlement processing.

BRIEF DESCRIPTION OF THE DRAWINGS

FIG. 6 shows the login screen.

FIG. 8 discloses the menu bar details.

FIG. 14 shows the data confirmation screen.

FIG. 16 shows the confirmed data list screen.

FIG. 17 shows the confirmed data detail screen.

FIG. 18 shows the payment list screen display.

FIG. 19 shows the payment display screen.

FIG. 23 presents a flowchart describing the set-off process.

FIG. 30 shows the company certificate acquisition screen.

FIG. 33 shows the certification receipt screen.

FIG. 34 shows the company registration screen.

FIG. 36 shows the company registration request screen.

FIG. 37 shows the company list screen.

FIG. 38 shows the company detail information screen.

FIG. 42 discloses the notarization data list screen.

FIG. 43 discloses the notarization data confirmation screen.

FIG. 44 discloses the notarization data confirmation screen.

FIG. 45 discloses the notarized data list screen.

FIG. 46 discloses the notarized data detail screen.

FIG. 47 discloses the payment list screen display.

FIG. 48 discloses the payment screen.

DESCRIPTION OF THE PREFERRED EMBODIMENT

The preferred embodiments of the present invention are hereunder explained using accompanying figures.

Figure 1:
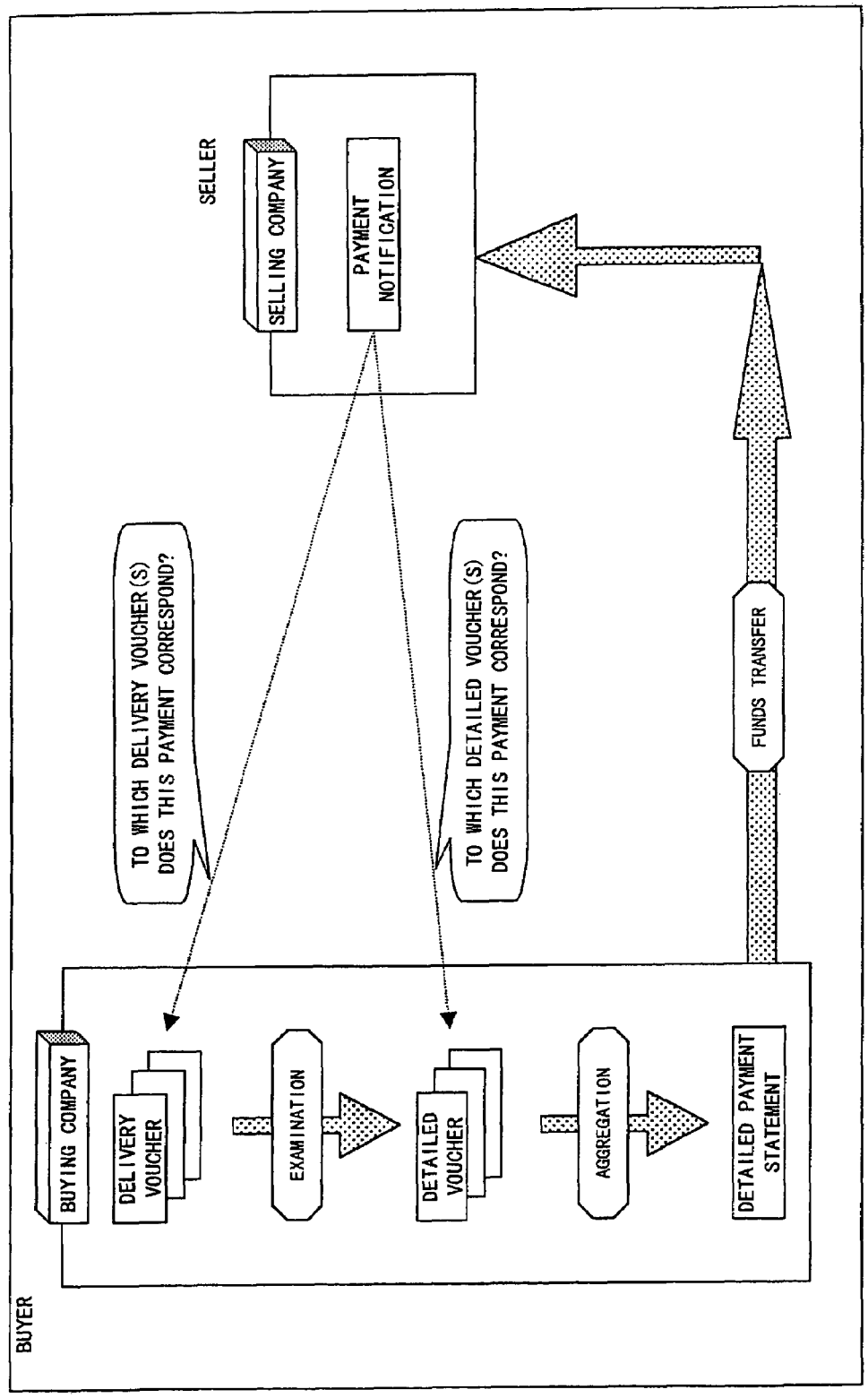
FIG. 1 shows, illustratively, a conventional account settlement system.
Figure 2:
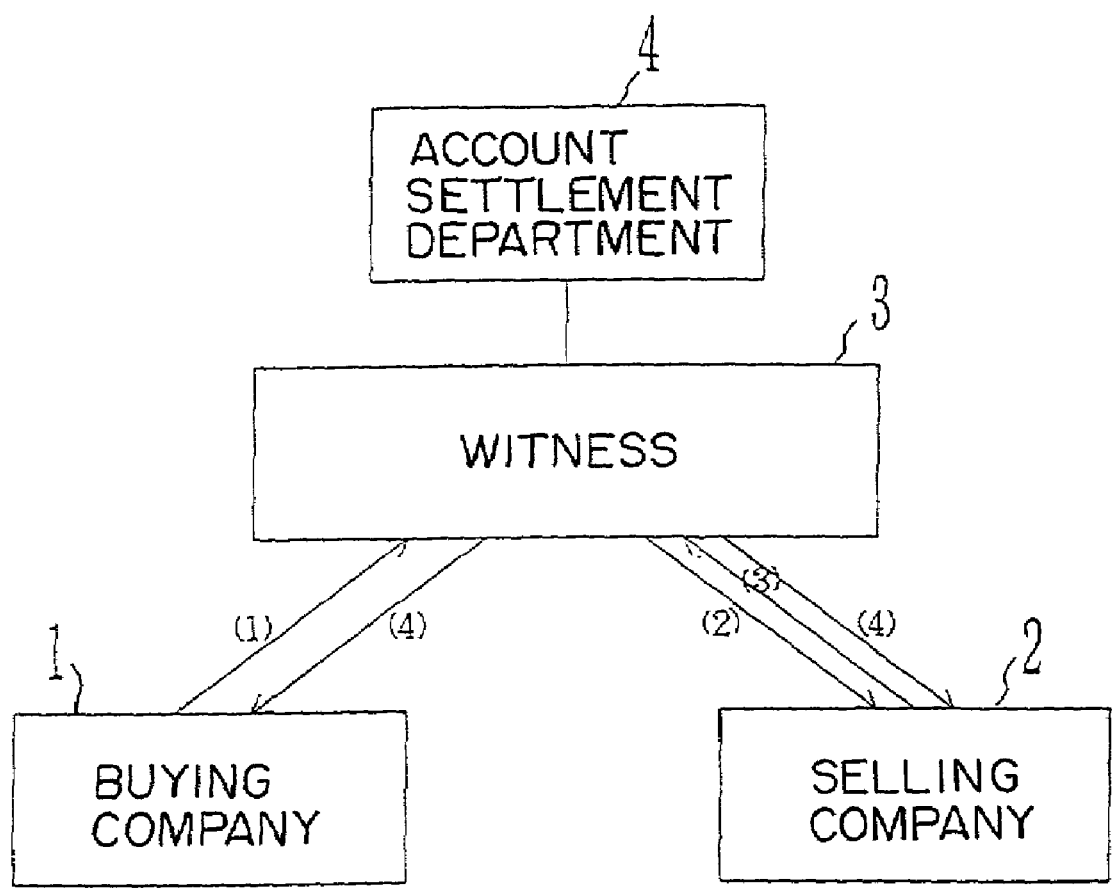
FIG. 2 discloses the specific structure of the system.

FIG. 2 discloses the basic structure of the Witness system's preferred embodiment. The illustrative Witness system consists, fundamentally, of: (1) a buying company, as "buyer"; (2) a selling company, as "seller"; and (3) the Witness, which authenticates, as between buying company 1 and selling company 2, delivery vouchers and similar seller records. A buying company 1 purchases goods from a selling company 2. The buying company is, for example, a large supermarket or store, and the selling company is, for example, a vendor that delivers goods to large supermarkets and like purchasers. The goods delivered to the buying company consist, by way of illustration, of foodstuffs, articles of clothing, daily necessities, and all varieties of commercial goods.

First, buying company 1 sends to the Witness 3 data that buying company 1 wishes to have confirmed by the Witness 3. Exemplary data include that which is recorded on a delivery voucher (see FIG. 2(1)). Having received this data, the Witness first makes record only of the fact that it has received a request, and then sends the request, as is, to selling company 2 (see FIG. 2(2)). Having received the confirmation request, selling company 2 confirms the contents recorded in the aforementioned data and then executes, with respect to the Witness 3, a confirmation response indicating whether selling company 2 agrees with said data (see FIG. 2(3)). The Witness 3 receives the confirmation response and, if selling company 2 agrees with the recorded contents, transmits to buying company 1 and selling company 2 a confirmation response representing that both parties have verified the aforementioned data (see FIG. 2(4)).

The Witness 3 is thus possessed of faculties for undertaking simple recordation of the fact that it has received data from the buying company 1 and for proceeding further to confirm data (confirmation documents) exchanged between the buying and selling companies. The Witness 3 manages data and performs account settlement (accounting) processes relating, for example, to detailed payment statement making and funds transfers.

Figure 3:
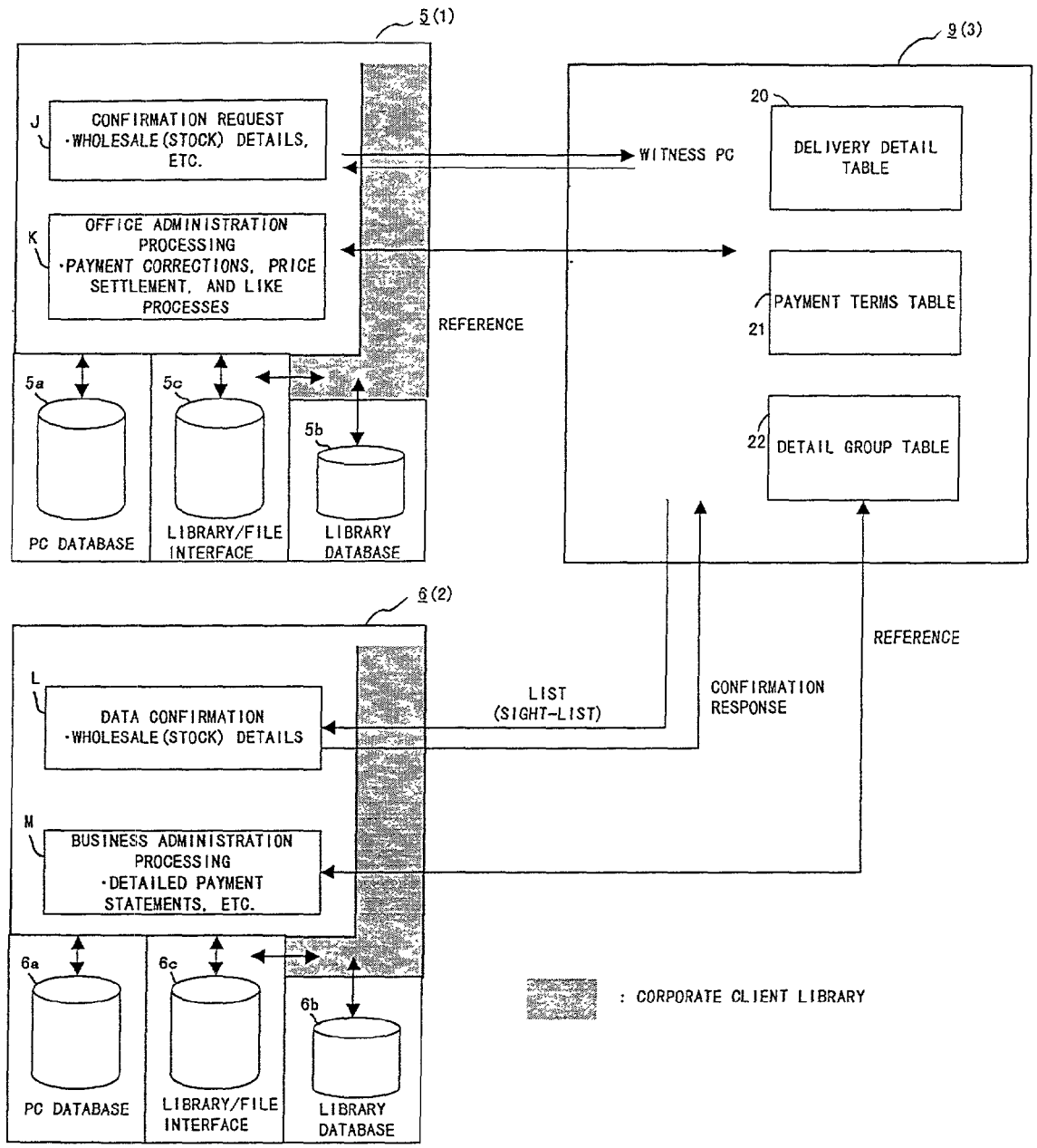
FIG. 3 discloses the basic structure of the preferred embodiment of the Witness system.

FIG. 3 discloses the specific structure of this system. In this figure, diagram 5 represents the buying company's computer, and diagram 6 represents the selling company's computer (buying company 1 and selling company 2 are shown in FIG. 2). The Witness PC 9 corresponds to the aforesaid Witness 3. This Witness PC 9, among other things, confirms delivery voucher data output from the buying company's computer 5, and receives confirmation responses output from the selling company's computer 6.

The Witness server 9 comprises: Delivery detail table 20, which preserves in memory documentation relating, by way of illustration, to delivery vouchers confirmed by monitoring system PC 9; payment terms table 21, which is described hereinafter; and detail group table 22. The above-mentioned computers 5 and 6 can access directly the monitoring system 9 and can refer, illustratively, to the aforesaid confirmation documents.

Additionally, as disclosed in FIG. 4, computer 5 and computer 6 each perform processes described hereinafter according to programs (data) stored, for instance, in CPU RAM or on hard disk. The aforesaid programs may be supplied from either CD-ROM or floppy disk, or, alternatively, from a program (data) provider by means of a circuit.

As disclosed in FIG. 3, the buying company's computer 5 executes requests for confirmation (process J) and executes administrative processing (process K). The aforesaid processes are performed using database 5a and library database 5b (in computer 5). Library interface 5c is used in this case. Similarly, the selling company's computer 6 executes data confirmation requests (process L) and administrative processing (process M). These processes are performed using database 6a (in computer 6) and library database 6b, via library interface 6c. The dotted portions in FIG. 3 represent a corporate client library, which functions, by way of illustration, as an interface for connecting to a network.

The specification next describes processing in a Witness system constructed as described above.

Figure 5:
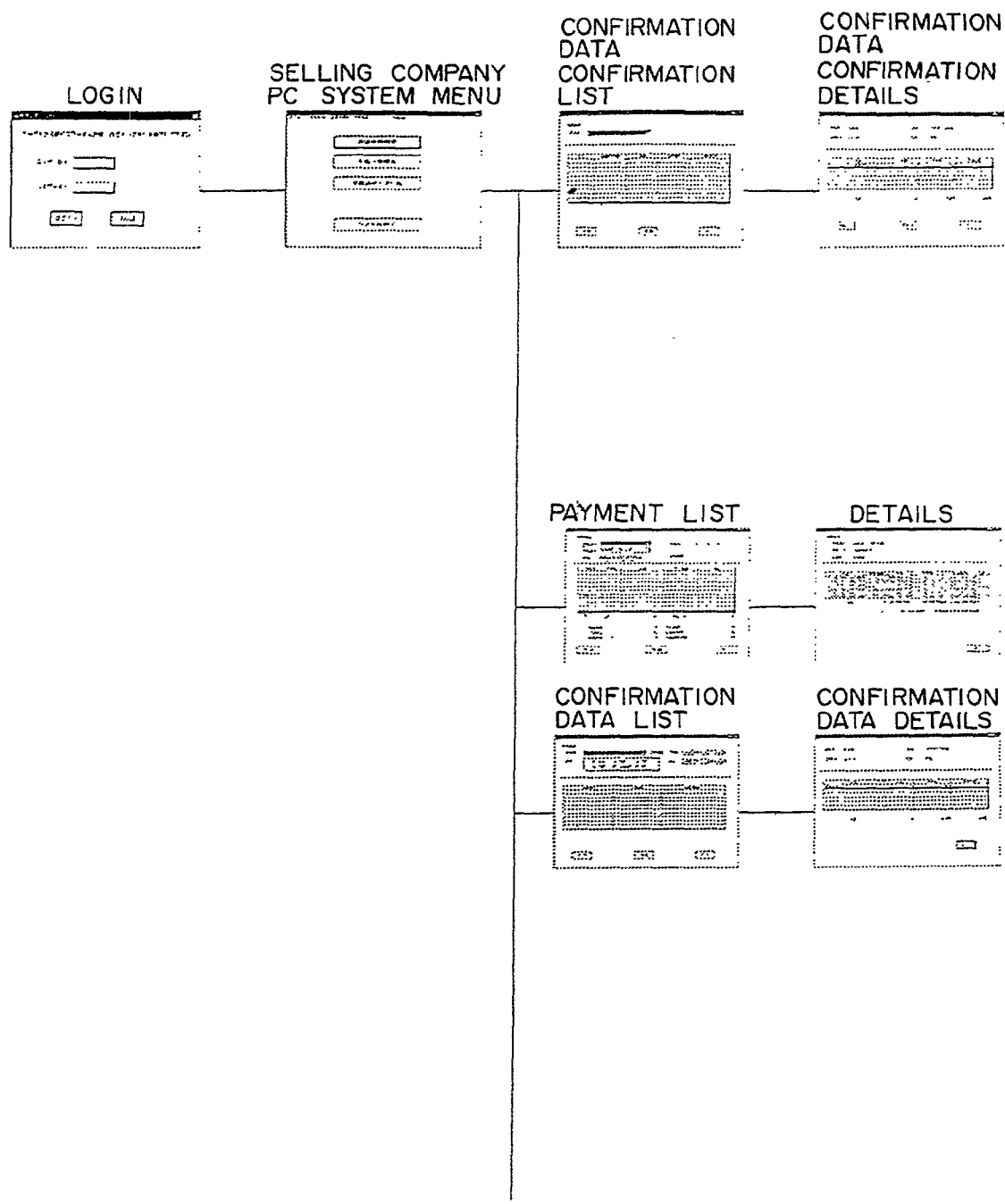
FIG. 5 discloses the order in which the computer performs processes J and K, and L and M, respectively.

FIG. 5 discloses the order of processing when computer 5 executes processes J and K, or, alternatively, when computer 6 performs processes L and M. The display screen transition also is shown in FIG. 5.

To begin processing for buying company 1, the user powers up computer 5, enters network user name and password, displays the icon corresponding to this system by, for example, clicking the [OK] indication on the screen, and double-clicks said icon to start the system. The same procedure is followed to start the selling company's computer 6, as well as the Witness PC 9.

The above-described process causes a login screen, as represented in FIG. 6, to appear on the display of computer 5 (and on that of computer 6). This login menu is used to start the Witness system disclosed in the illustrative embodiment and corresponds to the start screen in FIG. 5.

By entering a user I.D. and network password and activating the login button from this screen, computer 5 (computer 6), for example, checks the user I.D. and password and, if they match, shifts to menu display to display the menu screen. If the cancel button is pressed, the display returns to the previous OS start screen.

Figure 7:
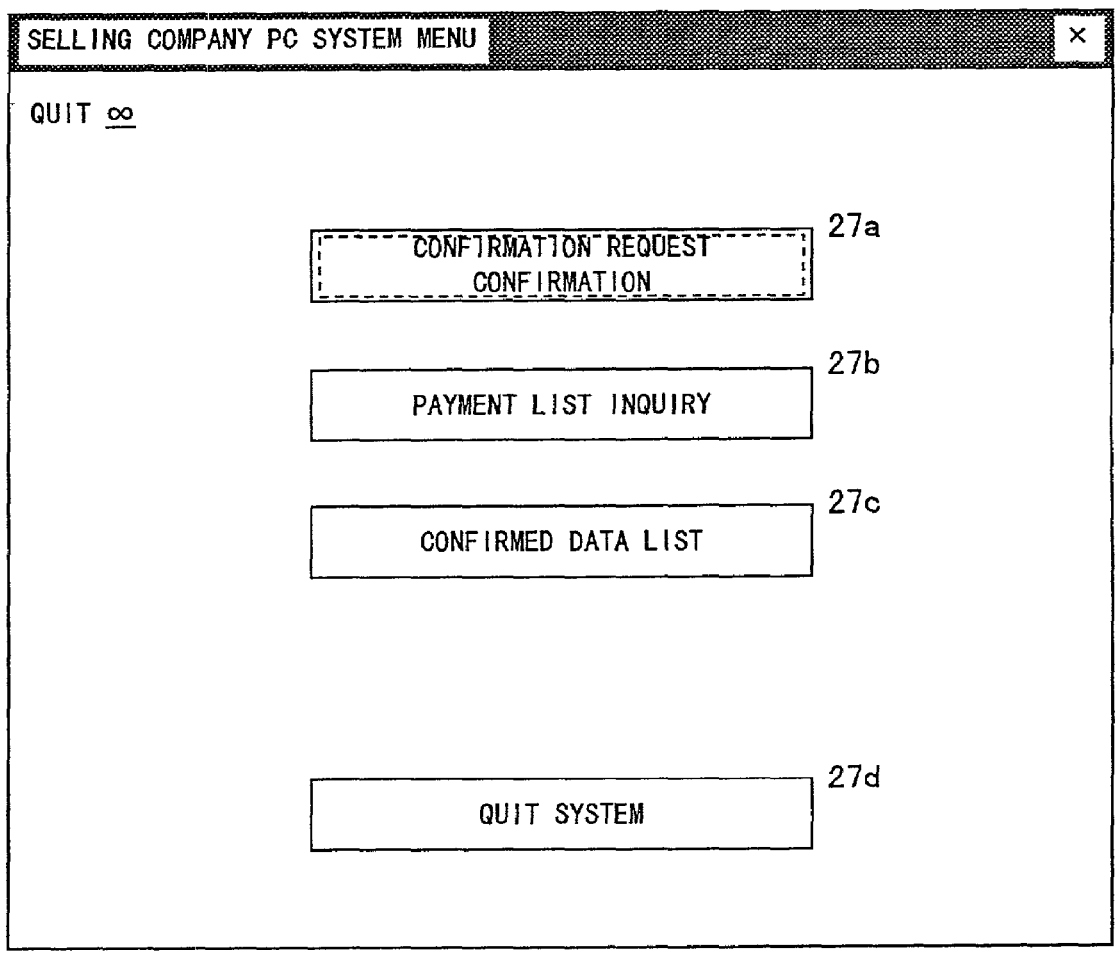
FIG. 7 shows a screen displaying the start menu.
Figure 8:
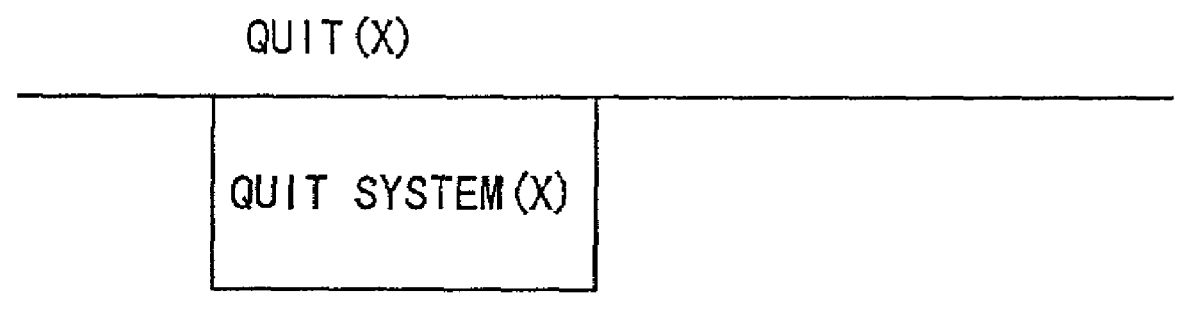

FIG. 7 shows the start menu displayed in response to manipulation of the aforesaid login button. Said start screen consists of four buttons (display), 27a-27d, and a menu bar. As FIG. 8 discloses, the menu bar includes a quit bar.

First, each button on the start menu is explained. Button 27a is used when directing the system to perform a confirmation request. Button 27b is used when directing the system to perform a payment list inquiry. Button 27c is used to direct the system to look at confirmed data. Button 27d is used to close the program described in the illustrative embodiment. Each button is activated, for example, by manipulating a mouse so as to position the cursor at any one of the buttons 27a-27d, and then double-clicking the mouse button.

As disclosed above, among the processes that buyer company's computer 5 performs are processes J and K, and among those performed by selling company's computer 6 are processes L and M. These processes are specifically explained below.

Confirmation Request Process (Process J):

This process is performed by buying company 1 and is carried out based on either a delivery voucher, order voucher, or invoice, any of which serves as a seller record. Specifically, the buying company 1 produces confirmation documents based on a voucher sent to it by selling company 2 and then sends the documents to the monitor.

Figure 9:
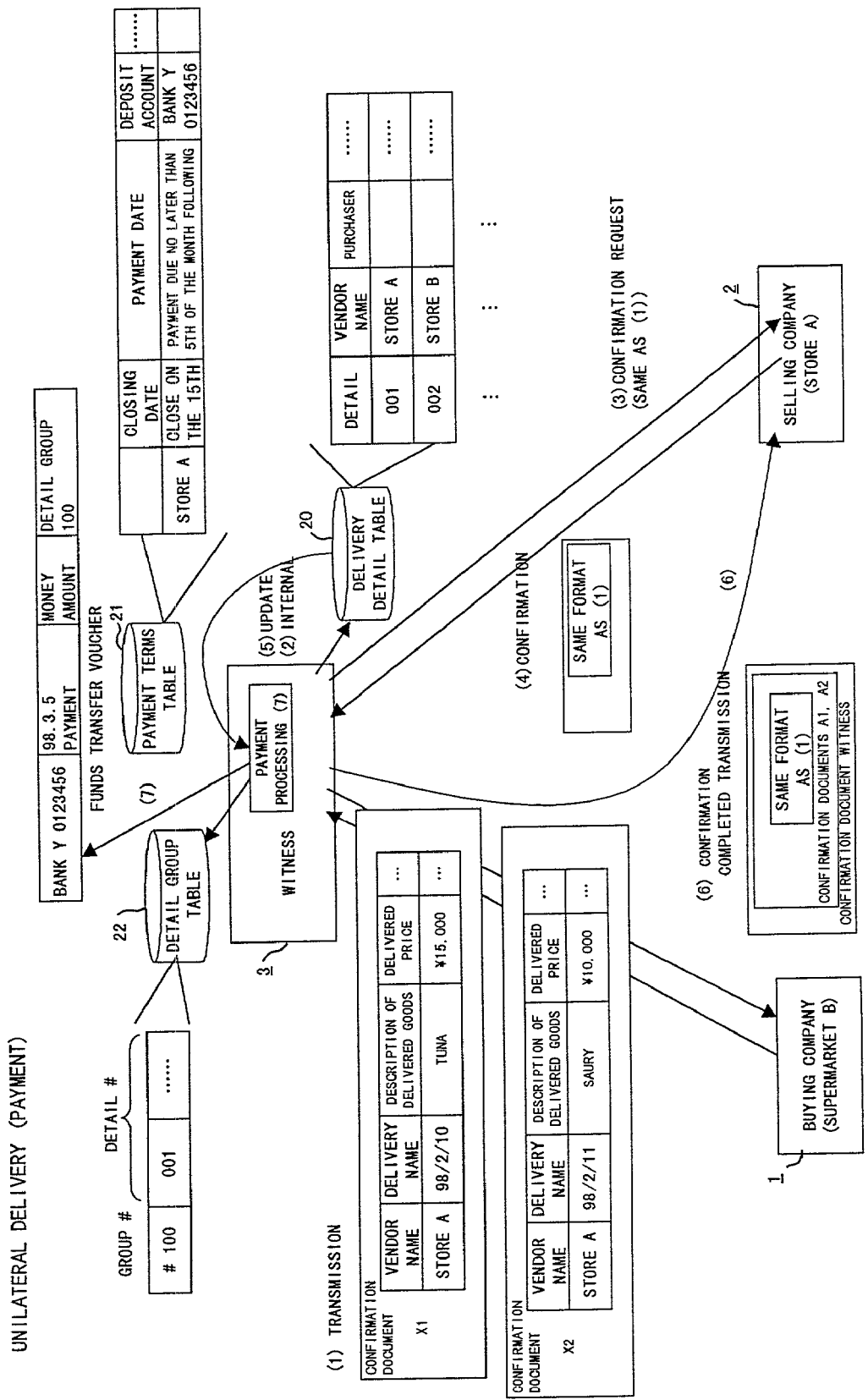
FIG. 9 describes specifically the preferred embodiment.
Figure 10:
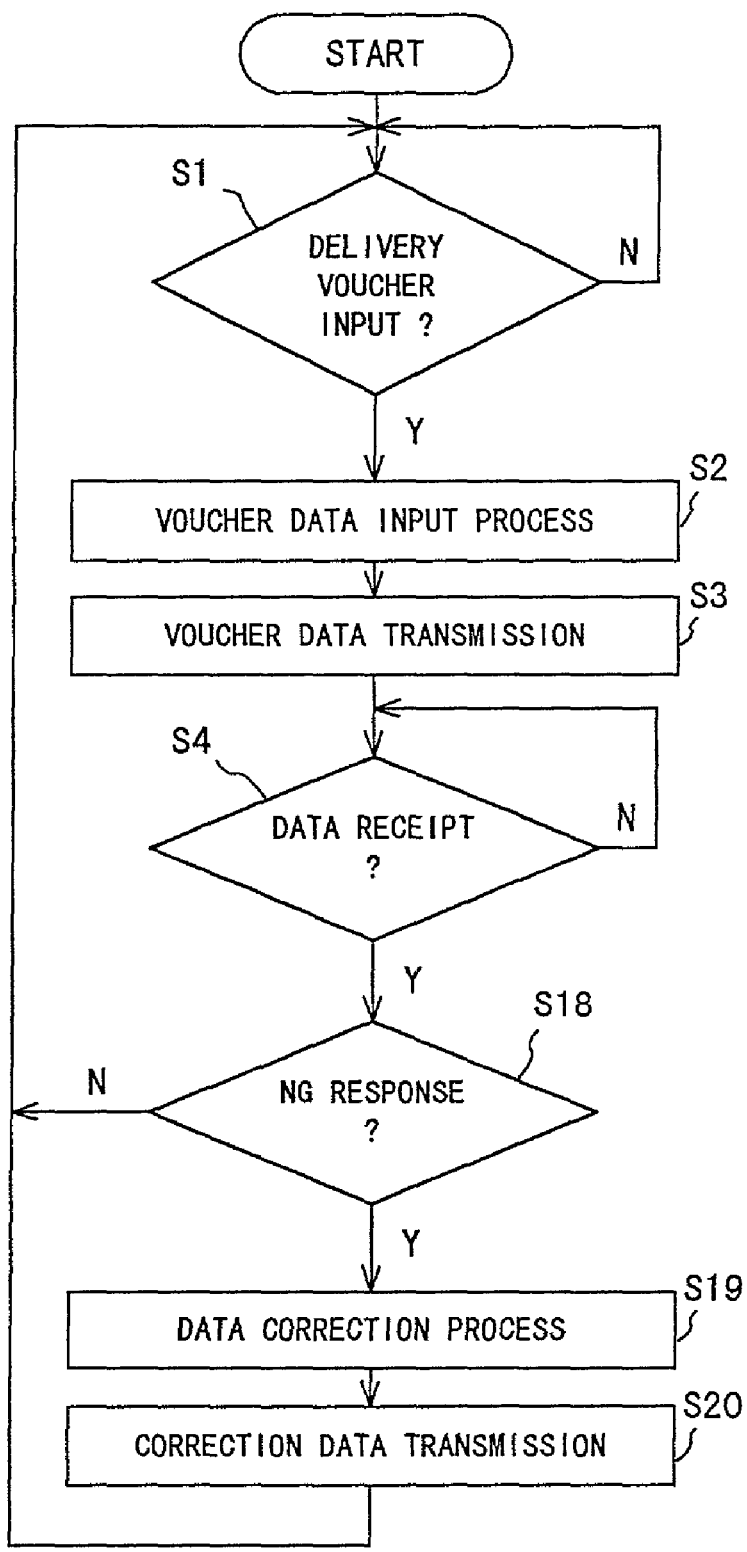
FIG. 10 presents flowchart describing the processes performed by computer 5.

FIG. 9 specifically describes this process. FIG. 10 presents a flowchart explaining the processes performed by computer 5. Each time buying company 1 receives goods from selling company 2, the data contained in the delivery voucher that buying company 1 receives is output from computer 5 to the Witness PC 9.

As FIG. 9 illustrates, store A, the selling company 2, delivers to supermarket B, the buying company 1, certain foodstuffs and, at that time, sends to supermarket B a delivery voucher (or, alternatively, tenders the voucher with the goods). Computer 5 waits for input of the delivery voucher (step 1, hereinafter "S1", is N (no)), and, when the delivery voucher is entered (S1 is Y (yes)), the system performs input processing of the voucher information. As the example presented in FIG. 9 shows, buyer company 1 (supermarket B) produces the aforesaid delivery voucher data as confirmation document X1. Included in this confirmation document X1 are, illustratively, deliverer's name (selling company 1), delivery date, description of delivered goods, and delivered price. The following information is illustrative of that which is reflected in the confirmation document: The aforesaid deliverer is store A; the delivery date is Feb. 10, 1998; the delivered goods consist of tuna; and the delivered price is 15,000 yen. This confirmation document X1 is transmitted (S3) from buyer company 1 to the Witness 3 (see FIG. 9(1)). Buying company's computer 5 thereafter waits for a response with respect to the aforesaid transmitted data (S4).

Figure 11:
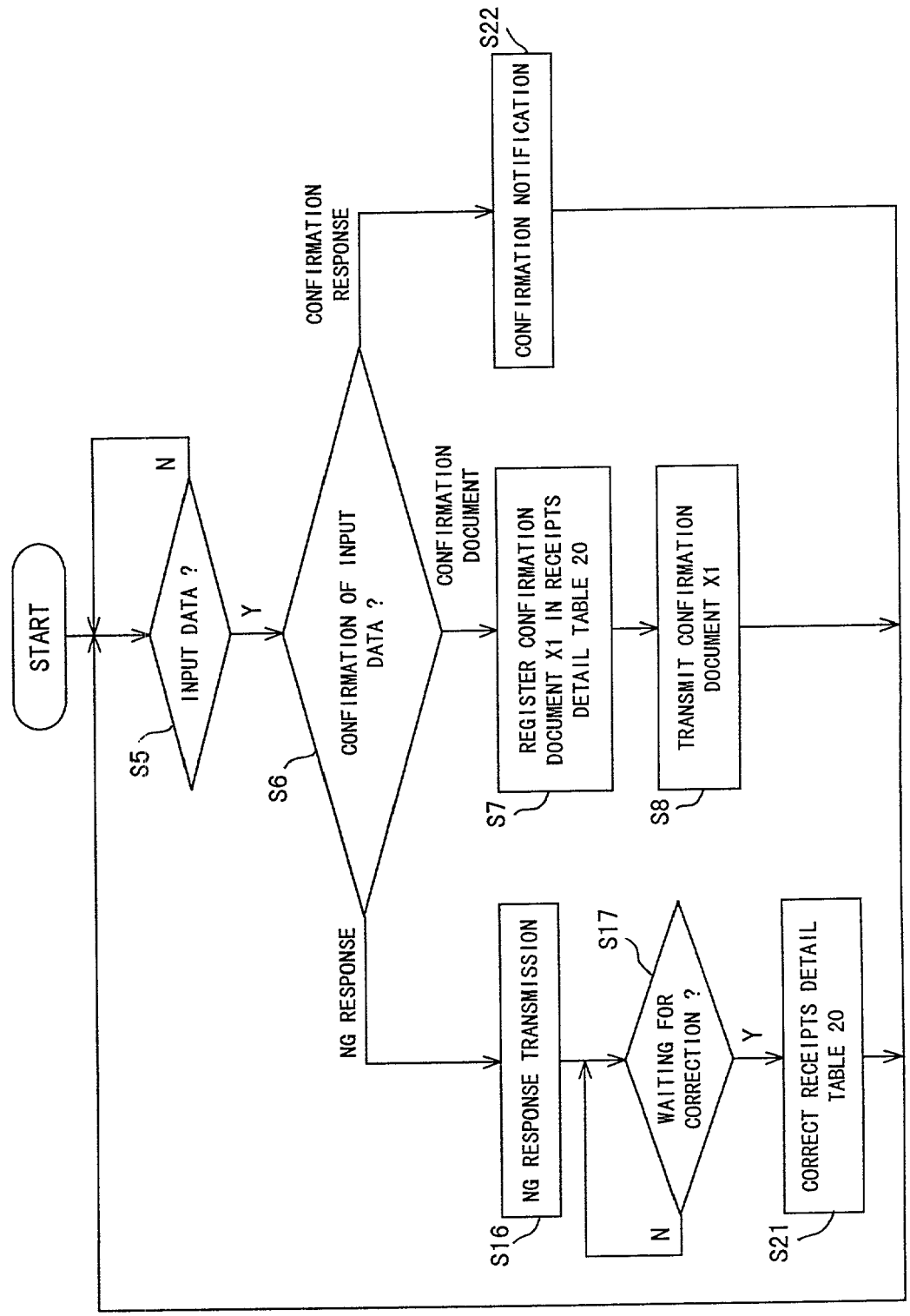
FIG. 11 presents flowchart describing the processes performed by the Witness PC.

FIG. 11 presents a flowchart describing the processes performed by selling company's computer 6. The Witness PC 9 waits for the data input from the aforesaid computer 5 (S5 is N (no)), and, when the input is available (S5 is Y (yes)), confirms the content of the input data (S6) and, where, for example, the data supplied to the monitor PC 9 correspond to the above described confirmation document X1, said confirmation document X1 is registered in detail table 20, described above (S7) (see FIG. 9(2)). Confirmation document X1 is then output, as is, to selling company's computer 6 (S8).

Figure 12:
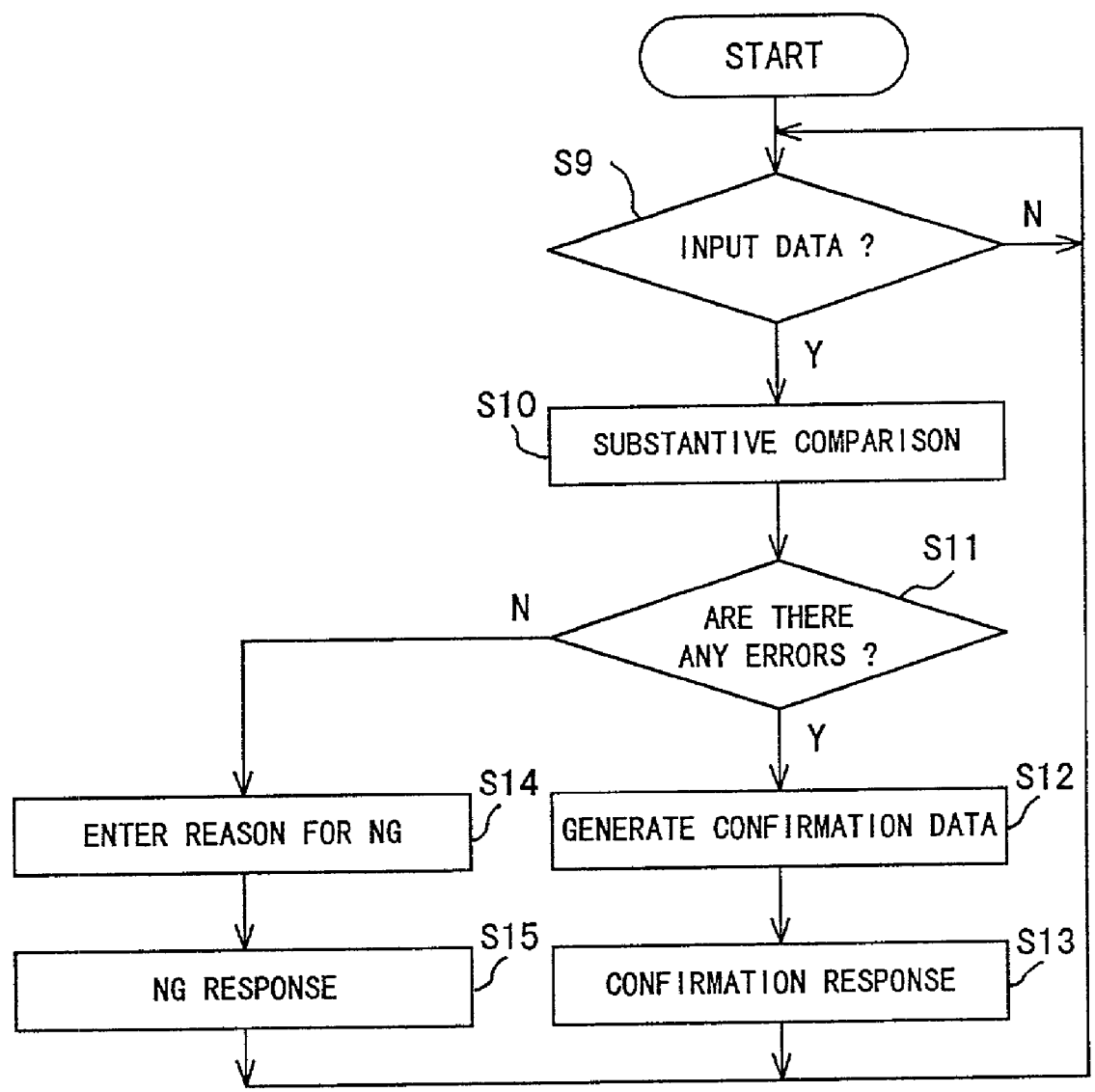
FIG. 12 presents a flowchart describing the processes performed by computer 6.

FIG. 12 is a flowchart describing the process that selling company's computer 6 performs. As described above, computer 6 waits for the confirmation document X1 input sent from the Witness PC 9 (S9 is N (no)), and, when confirmation document X1 is input (S9 is Y (yes)), compares confirmation document X1 with the contents of the delivery voucher that it previously sent (or tendered with delivery) (S10). It also checks for the presence of errors in the contents of the delivery voucher. As noted above, it is selling company 2 that performs this error-checking task. A "buying company" with whom selling company 2 places its goods is, however, not strictly limited to a specific company (the aforesaid buying company 1). Accordingly, when undertaking the above-described error-checking task, selling company 2 presses the confirmation request button on the computer 6 start menu (see FIG. 7) and displays the confirmation data list screen shown in FIG. 13.

Figure 13:
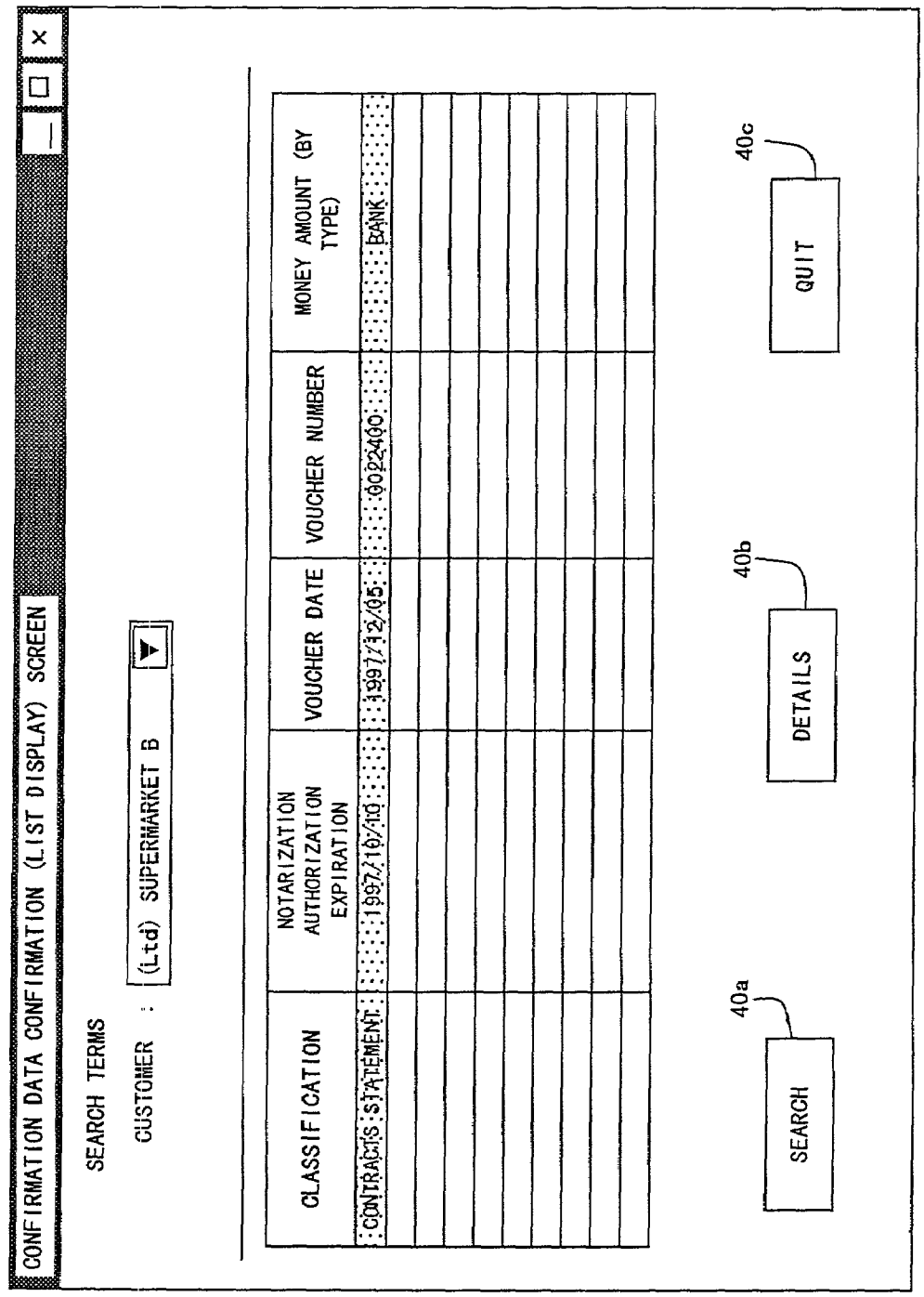
FIG. 13 shows the confirmation data list screen.

FIG. 13 is illustrative of the result following manipulation of retrieve button 40a, located on the confirmation data sight screen, and subsequent selection of "supermarket B". To confirm this certification, selling company 2 presses detail button 40b and displays the detail screen. Pressing the quit button 40c restores the above-described start menu.

Here, the aforesaid detail button 40b is pressed, and the detail screen depicted in FIG. 14 appears. While looking at this screen, selling company 2 compares the content of the confirmation document X1 sent by the monitor 3 with the content of the delivery voucher, or similar document, issued by selling company 2 (S10). Selling company 2 then determines whether there are any errors (S11). Here, if both documents are in substantive agreement, selling company 2 presses confirmation button 41a. The confirmation data is then produced and transmitted to the Witness PC 9 (S11 is Y (yes), S12, and S13) (see FIG. 9(4)).

Figure 15:
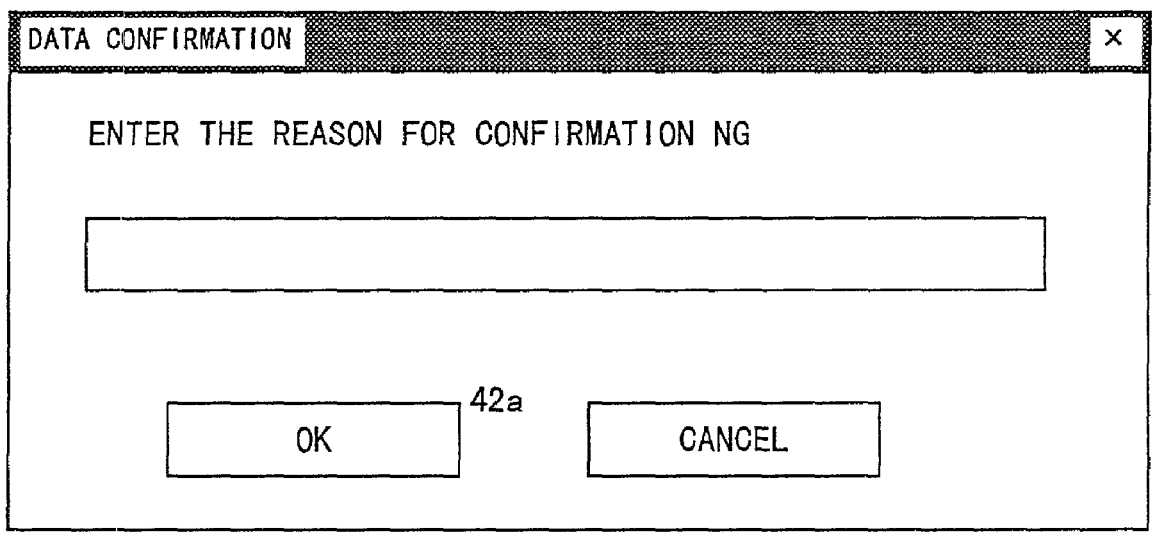
FIG. 15 shows the data confirmation screen.

If, on the other hand, it is determined that the aforesaid delivery voucher, or similar document, and the confirmation document X1 differ substantively (S11 is N (no)), selling company 2 presses NG button 41b, shown in FIG. 14, and produces the display disclosed in FIG. 15. Specifically, selling company 2 in this case describes the reason for the NG condition (S14), presses OK button 41, shown in FIG. 14, and sends a NG response to the Witness PC 9 (S15).

When this NG response is available (S5 in FIG. 11, is Y (yes)), the Witness PC 9 judges the contents of the input data (S6) and, in the case of a NG response, sends this information, as is, to buying company's computer 5 (S16). The Witness system thereafter waits for correction data input (S17). Buying company's computer 5 thus waits for the receipt of data (S4) and, in the case of a NG response when the response data is input (S18, see FIG. 10, is Y (yes)), undertakes correction corresponding to confirmation document X1 (S19). The corrected data is sent a second time to the Witness PC 9 (S20), and receipt detail table 20 of the Witness PC 9 is corrected (S17 is Y (yes), S21). Specifically, selling company 2 is able to: learn of an error or errors in the details generated by buying company 1; notify buying company 1 of the error or errors; and (3) by, for example, correcting the content of the details, update the contents of receipt detail table 20, thereby enabling the of accurate details (see FIG. 9(5)).

The process described above is performed each time a delivery voucher is sent between buying company 1 and selling company 2, and several authentication documents are registered in the delivery receipt detail table 20 shown in FIG. 9. If, as represented in FIG. 9, the delivering company is store A, the delivery date is Feb. 11, 1998, the item delivered is saury, and the delivered price is 10,000 yen, a confirmation document X2, for example, is registered in the delivery detail table 20 according to the same process.

Where selling company 2 determines that there are no substantive errors as between its delivery voucher and the confirmation document X1, and selling company 2 sends a confirmation response to the Witness PC 9, the Witness PC 9 confirms the content of the input data (S5 and S6, shown in FIG. 11), and the Witness PC: 9 notifies buying company 1 and selling company 2 that the data has been confirmed by both parties (S22)

Specifically, when the Witness 3 has a "confirmation completed" input from selling company 2, it transmits to buying company 1 and selling company 2 verification-completed confirmation documents A and B, relating, for example, to the above-mentioned confirmation documents X1 and X2 (see FIG. 9(6)). The information thus transmitted from the Witness 3 is confirmed by both buying company 1 and selling company 2 and serves to verify that there is no substantive error in a confirmation document based, for example, on a delivery voucher.

When the confirmation process is completed as described above, confirmation documents based on several delivery vouchers are registered in the receipt detail table 20.

To refer in this state to data that have been confirmed and registered in the receipt detail table 20, the user presses the confirmed data list button 7c, thereby shifting the display from the start menu configuration to the confirmed data screen represented in FIG. 16. This confirmed data list screen enables the user to select, from among several customers, a customer with which the user has current transactions, such as, by way of illustration, "OO Foods Company", "XX Ham Company", or "ABC Company". The user can also specify and select items in classification areas, such as "wholesale", "set-off", "orders", "accounts receivable", "payment corrections", and "contracts". Pushing button 45a, moreover, displays the confirmed data detail screen, shown in FIG. 17.

FIG. 17 discloses, the detail screen that appears when, by way of illustration, "orders" is selected as the aforesaid classification item. As is shown in that figure, detailed information relating to the selected classification item is displayed, and the user is able to review in detail such specific authentication information as item name, quantity "10", unit cost "100 yen", and total cost "1000 yen".

Office Administration Processing (Processes L and M)

The specification next explains office administration processing. Office administration processing (process L) includes payment corrections, payment detail display, and like varieties of administrative processing. The payment correction process involves the correction of price or description of goods, pursuant to an indication of discrepancy made by selling company 2. Price establishment processes comprise, illustratively, responsive processes that are performed by confirming a detailed payment statement made by the Witness 3, and processes for outputting detailed payment statements that buying company 1 itself has made. These processes are specifically explained below.

FIG. 18 represents a payment list screen appearing, for example, on computer 5. This payment list screen can be displayed by pushing the payment list inquiry (reference) button 27b, thus bringing about a transition from the start menu configuration shown in FIG. 7. This payment list screen is generated by the Witness 3. By selecting payor, one is able to-select from among several possibilities a company with which the user has current transactions (e.g., "OO Foods Company", "XX Ham Company", or "ABC Company"). Similarly, a payee can be specified, and, by specifying a date certain, a payment list screen showing that date as the due date is displayed.

Displayed on this detailed list screen are the delivery date recorded on the payment voucher, voucher number, store name, wholesale price, and discount rate. An operator can specify another payment voucher about which information is desired, and, by pressing detail button 44a, can shift to the detail screen shown in FIG. 19.

The illustration in FIG. 19 represents a payment voucher issued against "OO Foods Company", pursuant to which payment to "ABC Company" is due no later than Aug. 12, 1997. When an operator at either buying company 1 or selling company 2 displays this information, the system investigates the product name, unit weight, quantity, unit price, and total price, and, in case of doubt, checks each detail registered in the above-mentioned receipt detail table 20. If, for example, the total amount is different from the total amount based on the delivery voucher in the operator's possession, each detail registered in the receipt detail table 20 is confirmed.

In this case, the system would refer to registered confirmation data residing in the receipts detail table 20. Specifically, by pushing the confirmed data button 7c from the start menu shown in FIG. 7, the aforesaid list screen, shown in FIG. 16, is displayed. It is also possible to cross-check payment data by displaying the confirmed data detail screen.

Making of the detailed payment statement is undertaken, for example, by the Witness 3, and completed by referring to the payment terms table 21. According to prior arrangement between buying company 1 and the Witness 3, or between selling company 2 and the Witness 3, information such as closing date, payment date, and deposit account number are for each company registered in the payment terms table. Additionally, each detail is numbered, and, to make data checking more convenient for buying company 1 and selling company 2, a detail group table 22, which groups the detail numbers, is provided.

Figure 20:
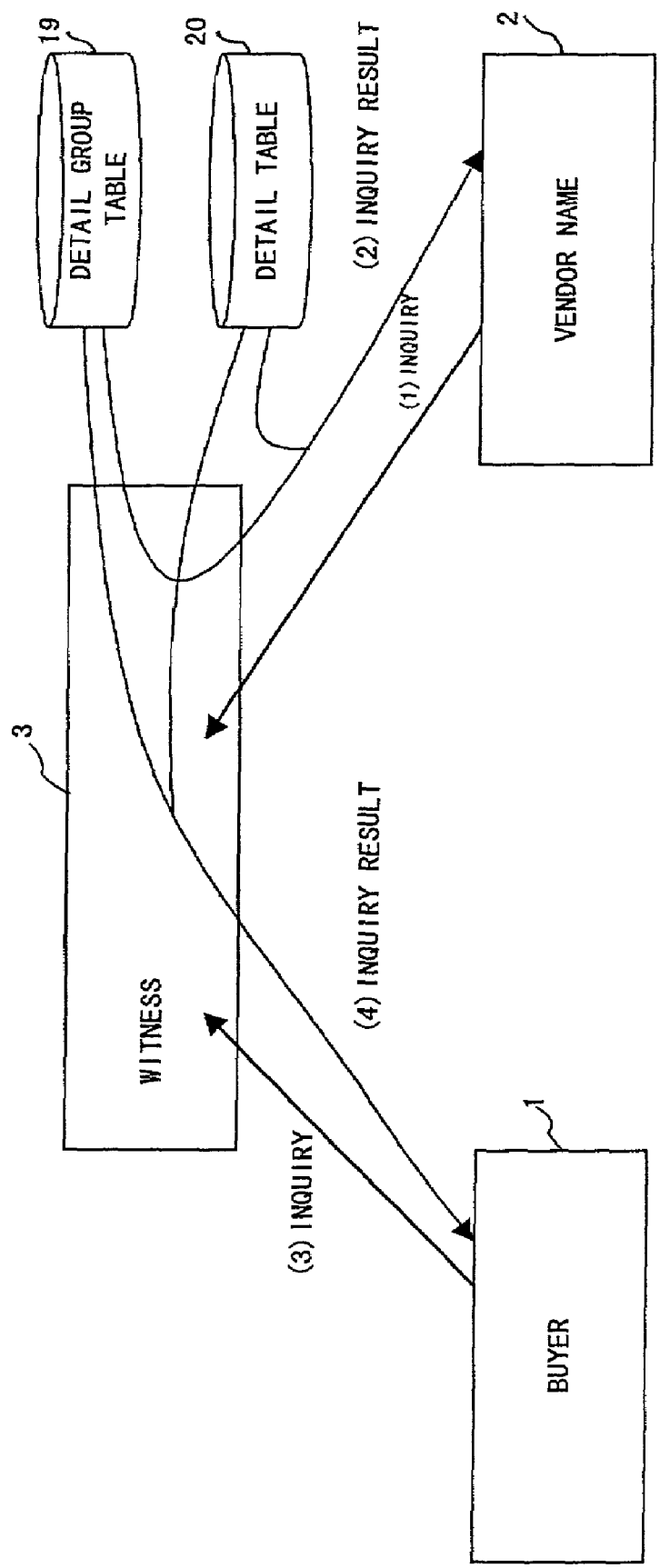
FIG. 20 discloses a scaled representation of the comparison process.

FIG. 20 presents a scaled drawing of the cross-checking process described above. Selling company 2 performs cross-checking of detailed information with the Witness 3 (see FIG. 20(1)) and, referring to either the receipts detail table 20 or the payment terms table 21, obtains the necessary detailed information (see FIG. 20(2)). On the other hand, buying company 1, also, performs cross-checking of detailed information with the Witness 3 (see FIG. 20 (3)), as required, and, referring to either the receipts detail table 20 or the payment terms table 21, obtains the necessary detailed information (see FIG. 20(4)).

Next, the Witness 3 specifies the deposit account of the accounting department (i.e., a designated bank) and makes a request for deposit, based on the aforesaid detailed payment statement (see FIG. 9(7)). Here, using FIG. 21, the specification explains the deposit and cross-checking processes.

Documents authenticated in the above-described manner are registered in the Witness server 8. First, the Witness 3 makes the detailed payment statement based on data registered in the receipts detail table 20 and then requests confirmation from buying company 1 (see FIG. 21(1)). Buying company 1 confirms the detailed payment statement sent to it and returns the statement as its request for funds transfer (see FIG. 21(2)). At this time, a delivery voucher index corresponding to the detailed payment statement is assigned to said statement.

Figure 21:
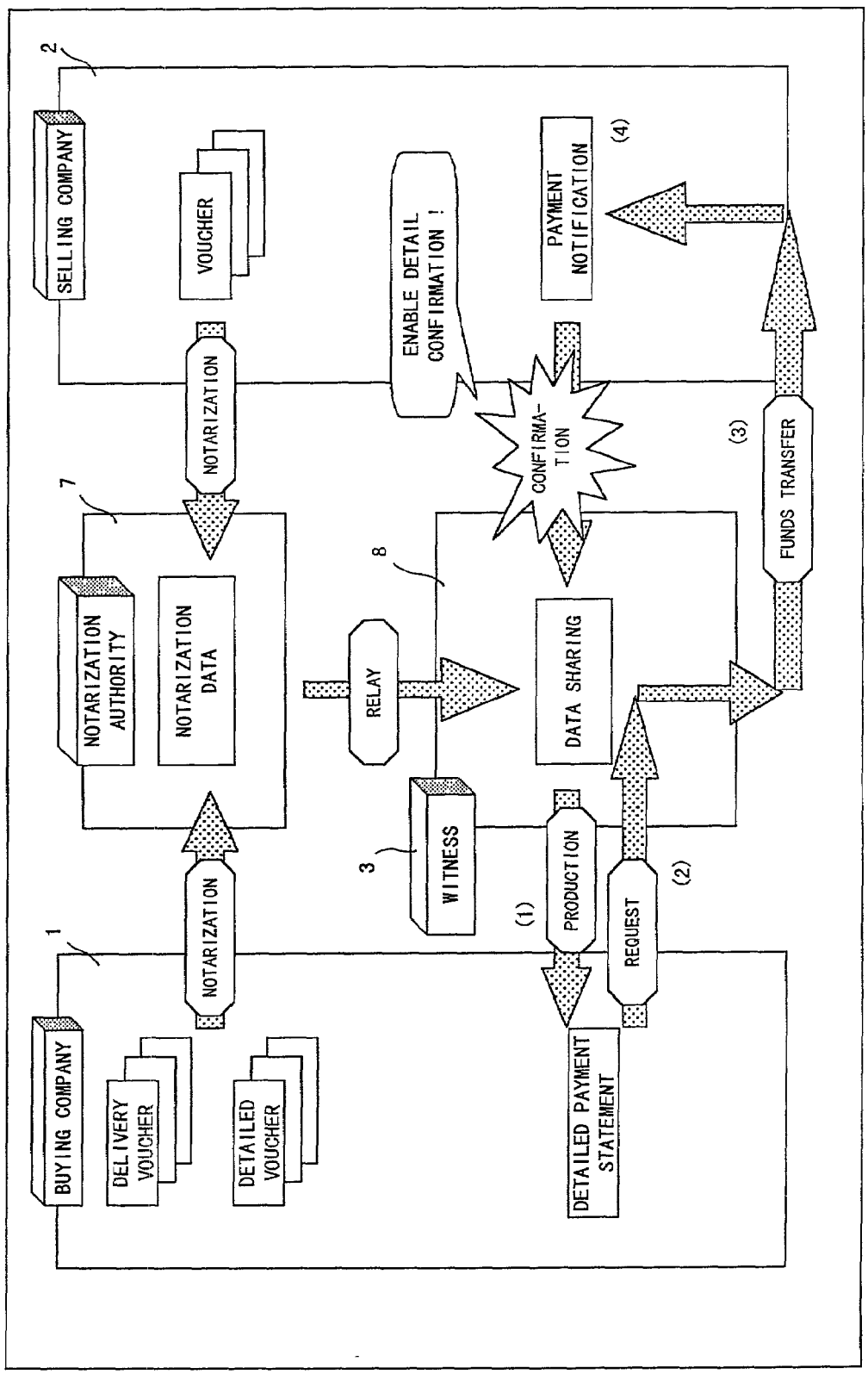
FIG. 21 describes represents the account settlement system in the case of funds transfer.

The aforesaid funds transfer request is delivered to the Witness 3 and forwarded to a bank (not shown in the instant drawing) (see FIG. 21 (3)). The information that the Witness 3 sends to the bank as the Witness' instruction for funds transfer comprises the money amount, transferor, transferee, and the detail index. Having been so instructed to transfer funds, the bank transfers funds to selling company's transaction bank, utilizing a suitable banking system, such as an inter-bank transfer system. The paying bank notifies selling company 2 of payment (see FIG. 21(4)).

By undertaking processing as described above, neither buying company 1 nor selling company 2 is required to hold several vouchers or invoices. Additionally, it is possible to perform efficient account settlement using data shared with the Witness server 9, First Alternate Embodiment:

The specification next describes the first alternate embodiment of the present invention. If buying company 1 and selling company 2 were to change places, processing efficiency would be impaired if respective detailed payment statements were made in the same manner as that contemplated in the preferred embodiment. This illustrative embodiment performs set-off processing and makes a detailed payment statement (suitable to the aforesaid contingency).

Figure 4:
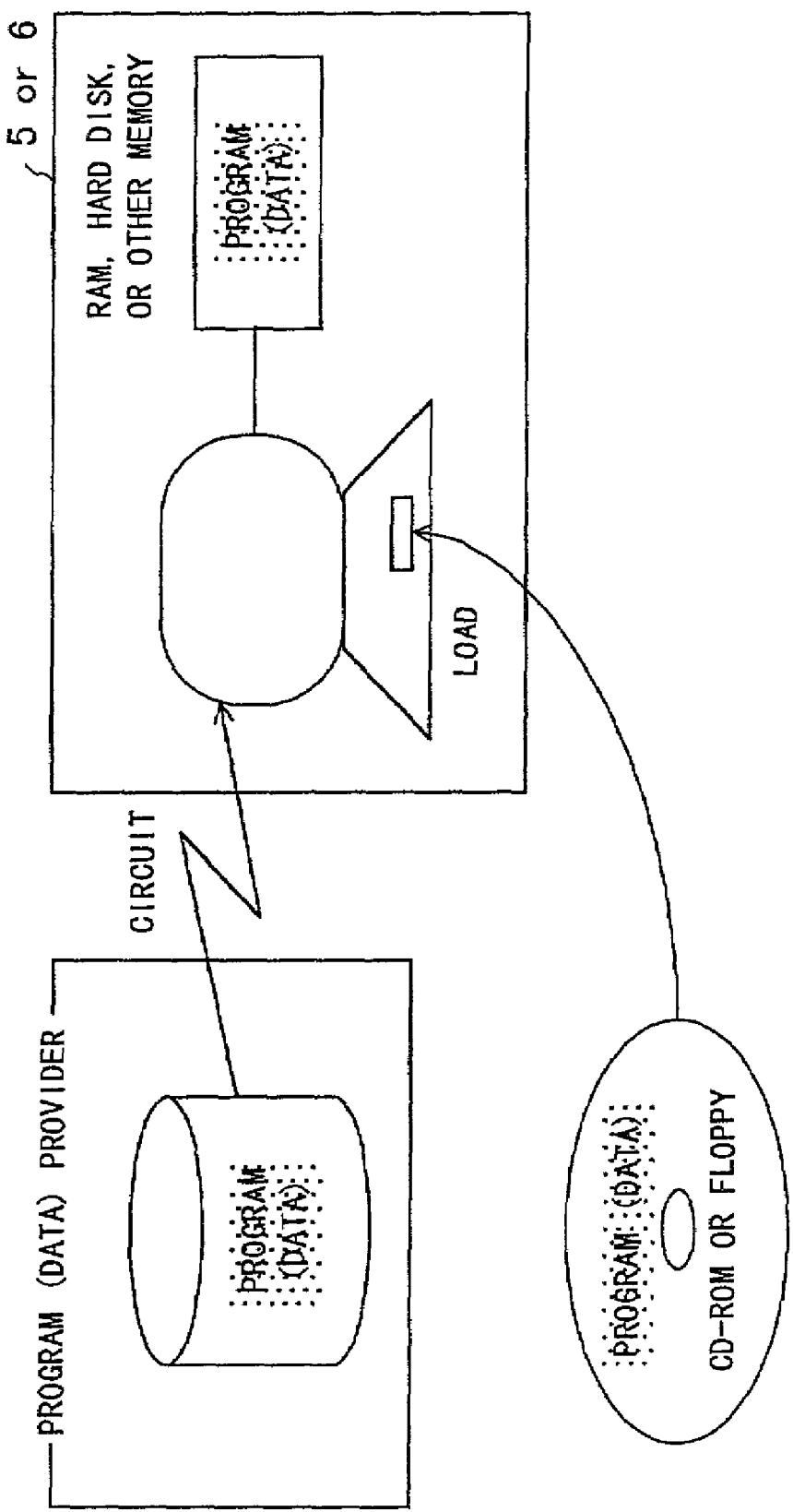
FIG. 4 discloses the structure that stores in memory media the programs for the illustrative embodiment.

Accordingly, the system structure disclosed in FIGS. 2 through 4, as well as the illustrative screen progression shown in FIG. 5, are the same as those in the preferred embodiment. The making of confirmation document X based on delivery vouchers from selling company 2 is the same as that undertaken in the preferred embodiment. The confirmation process at selling company 2, as well as the authentication processes performed by the Witness 3 are the same. A plurality of authenticated data are registered in the detail receipts table 20 of the Witness server 8, and the Witness 3 makes detailed payment statements matched to payment dates in the payment terms table 21.

Figure 22:
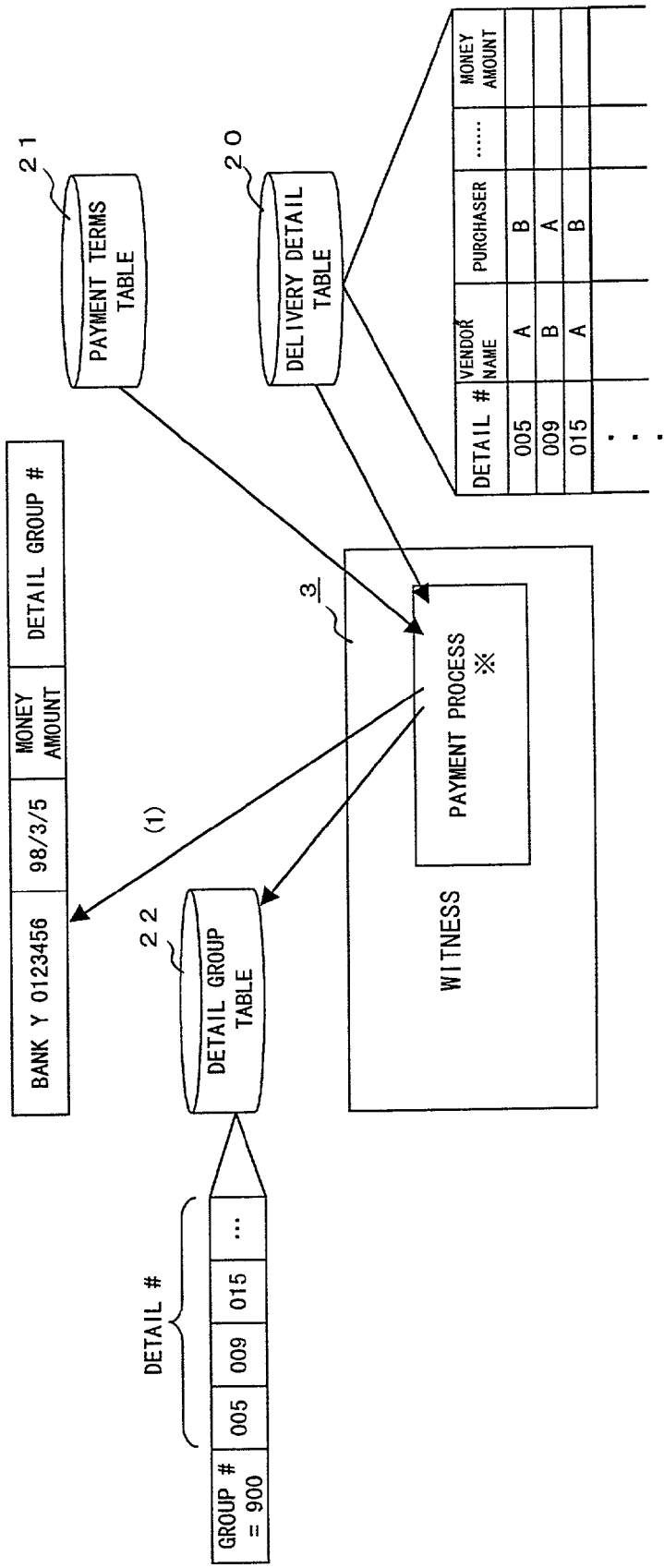
FIG. 22 discloses the set-off process flow.

FIG. 22 discloses the set-off process flow for the illustrative embodiment. FIG. 23 is a set-off process flowchart. The illustrative embodiment performs set-off where, according to the relationship between the aforesaid buying company 1 and selling company 2, buying company 1 bears a payment obligation with respect to selling company 2, and, at the same time, selling company 2 bears a payment obligation because, for example, it has purchased distinct goods from buying company 1. In this case, the system extracts all details relevant to buying company 1 and buying company 2 registered in delivery detail table 20 "vendor" and "buyer" columns (Step 1, hereinafter "ST" in FIG. 23). Respective payment amounts are displayed (ST2), the money amount where buying company 1 is the buyer and selling company 2 is the vendor is added (+), the money amount where selling company 2 is the buyer and buying company 1 is the vendor is subtracted (−), and the set-off amount is calculated (ST3).

The payment amount relating to mutual trade between buying company 1 and selling company 2 is thus set-off according to the above calculation, and, in the preceding illustration, if the total money amount carries a positive (+) value, buying company 1 pays to selling company 2 the resultant money amount (ST4 is Y (yes), ST5). If, on the other hand, the total money amount carries a negative (−) value, selling company 2 pays to buying company 1 the resultant total money amount (ST4 is N (no), ST6).

The money amount thus derived is reduced to a detailed payment statement, and, as described above, the Witness 3 specifies the accounting department (i.e., a designated bank) receiving account and executes a funds transfer request based on the aforesaid detailed payment statement (see FIG. 22 (1)). By performing processing as described above, it is possible to reduce the number of detailed payment statements and to make detailed payment statements with greater efficiency.

Set-off for payment amounts as between buying company 1 and selling company 2 is not limited to the foregoing illustrative embodiment, but is amenable to other methods as well.

Second Alternate Embodiment

The specification next describes the second alternate embodiment of the present invention.

The second alternate embodiment is an invention for safely performing account settlement in an account settlement system utilizing the Witness. This illustrative embodiment performs processing in accordance with authentication numbers after authenticating buying company 1 and selling company 2 in advance. Furthermore, the illustrative embodiment encodes data sent and received between buying company 1 and the Witness, or, alternatively, between selling company 2 and the Witness, and ensures the protection of data. This illustrative embodiment is explained below.

Figure 24:
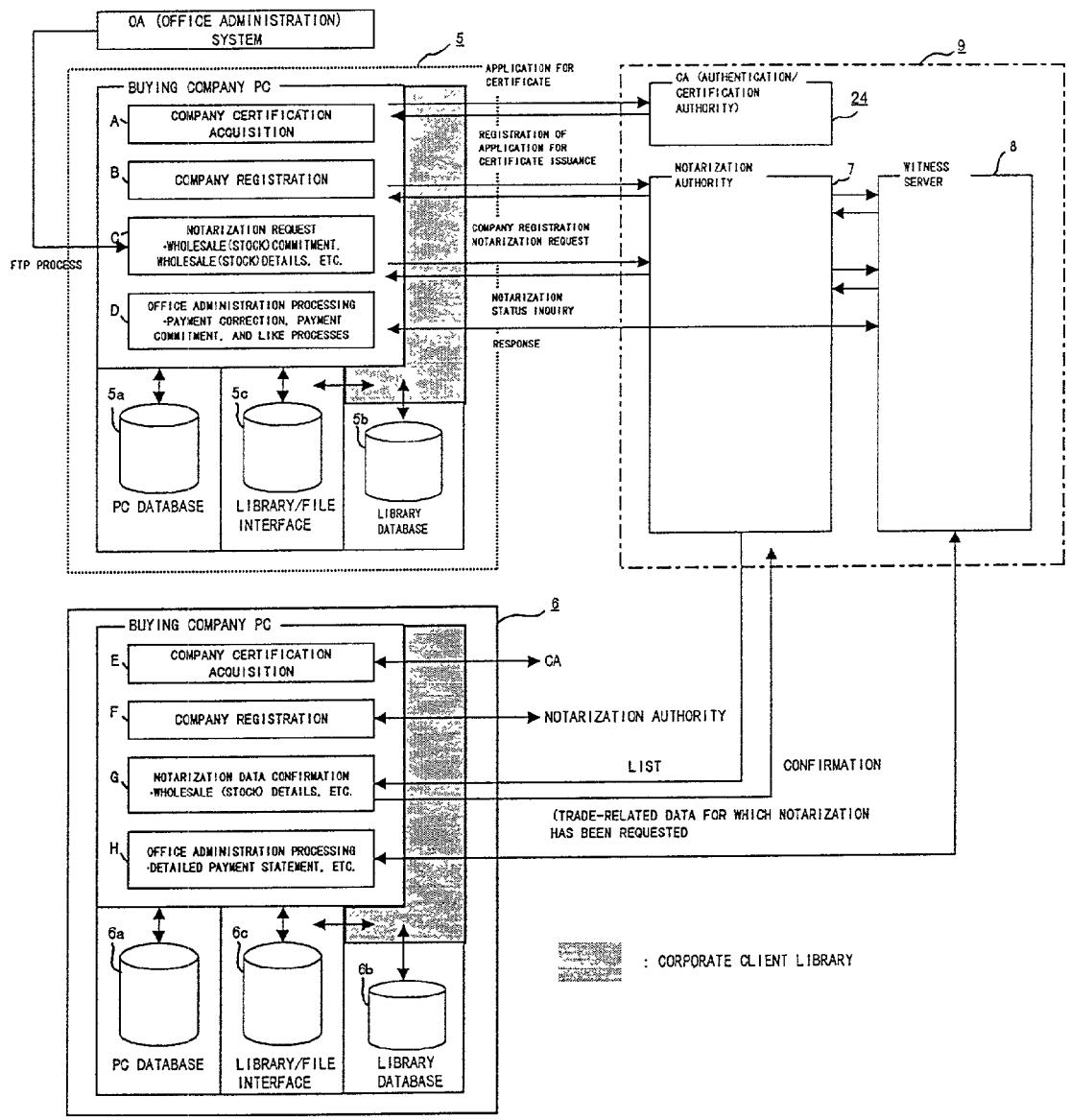
FIG. 24 discloses the basic structure of the second alternate embodiment of the Witness system.

FIG. 24 discloses the specific structure of this system. In this figure, 5 represents the computer of buying company 1, which is the same as that in the preceding illustrative embodiments, and 6 represents the computer of selling company 2. The notarization authority 7 and the Witness server 8 correspond to the aforesaid Witness 3 and are included in the Witness PC 9. The Witness PC 9 includes an authentication authority 24, which authenticates in advance the companies that participate in this system. Additionally, the Witness PC 9 in this illustrative embodiment notarizes (certifies) delivery voucher and like data output from buying company's computer 5, and also receives confirmation responses output from selling company's computer 6.

The Witness server 8 consists, among other things, of: detailed receipts table 20, which stores notarization documents, illustratively comprising delivery receipts notarized by the Witness PC 9; payment terms table 21; and detailed group table 22. The aforesaid computer 5 and computer 6 can access directly the Witness server 8, to refer to the above-mentioned notarization documents and like documents.

As disclosed in FIG. 24, buying company's computer 5 performs company certificate acquisition (process A), company registration processing (process B), notarization request processing (process C), and office administration processing (process D). Selling company's computer 6, on the other hand, performs company certificate acquisition (process E), company registration processing (process F), notarization data confirmation processing (process G), and office administration processing (process H).

The authentication authority 24 executes authentication of certification requests issued in regard to the corporate certificate acquisition processes (viz., process A and E) undertaken by buying company's and selling company's computers (computer 5 and computer 6, respectively). Similarly, the notarization authority 7 performs notarization of certificate issue registration requests issued in regard to company registration processing (viz., process B and F) carried out by buying company's and selling company's computers (computers 5 and 6, respectively).

Figure 25:
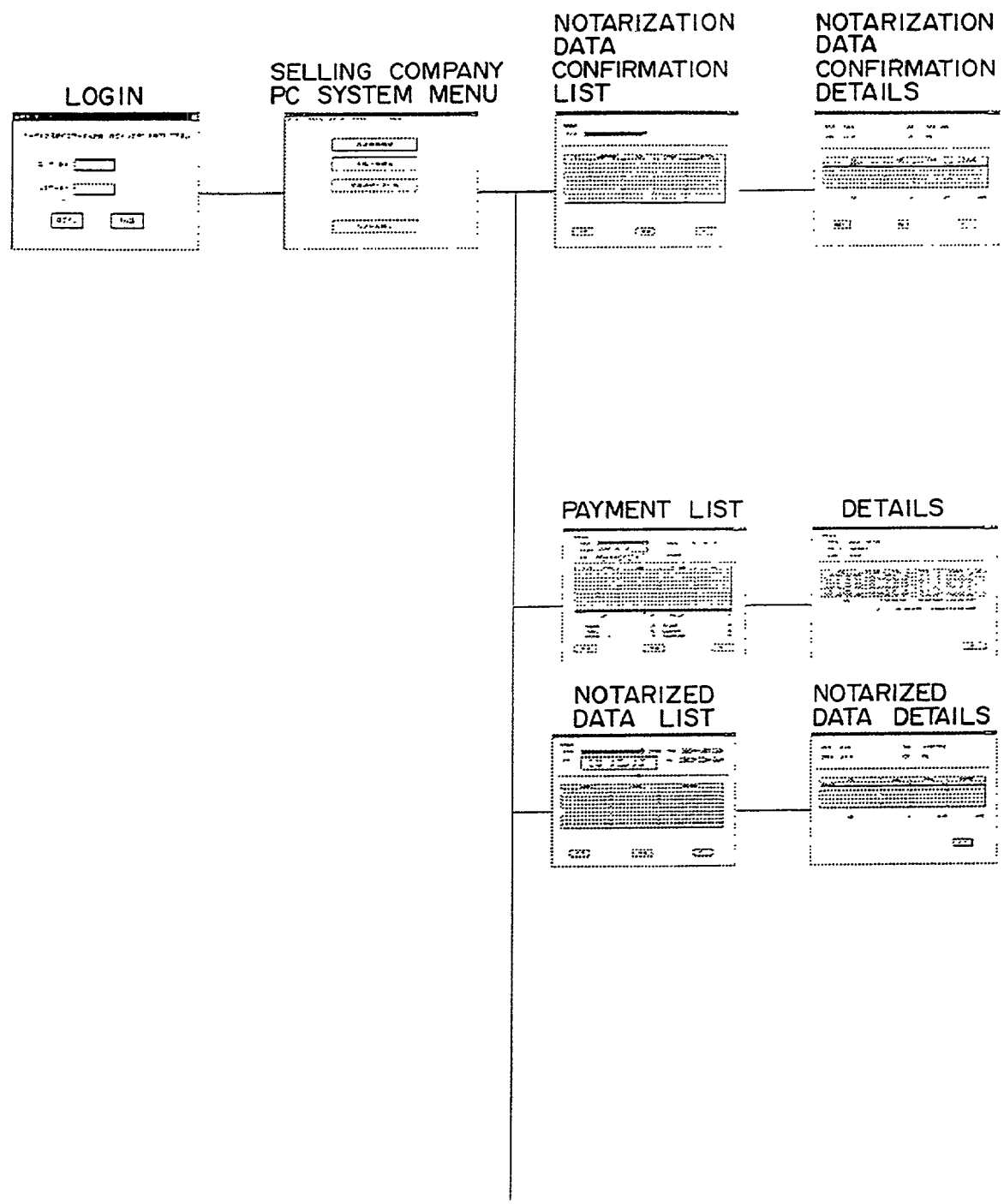
FIG. 25 describes, with reference to a representative display screen, the processes for the second alternate embodiment.
Figure 26:
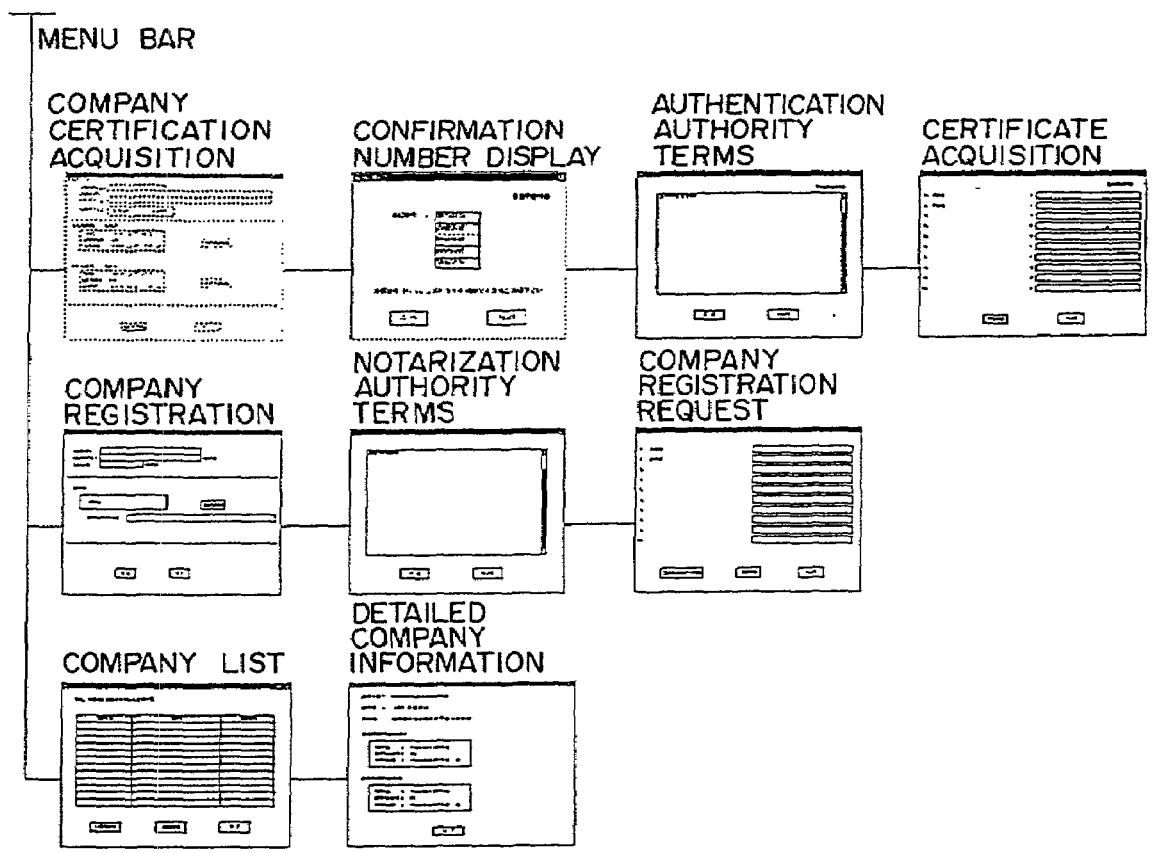
FIG. 26 describes, with reference to a representative display screen, the processes for the second alternate embodiment.

FIGS. 25 and 26 describe, in parallel with the representative screens that would appear on the display, the processes of this illustrative embodiment. A specific explanation follows.

In this illustrative embodiment, computers 5 and 6 and the Witness PC 9 are powered up, and the Witness system program is started.

Figure 27:
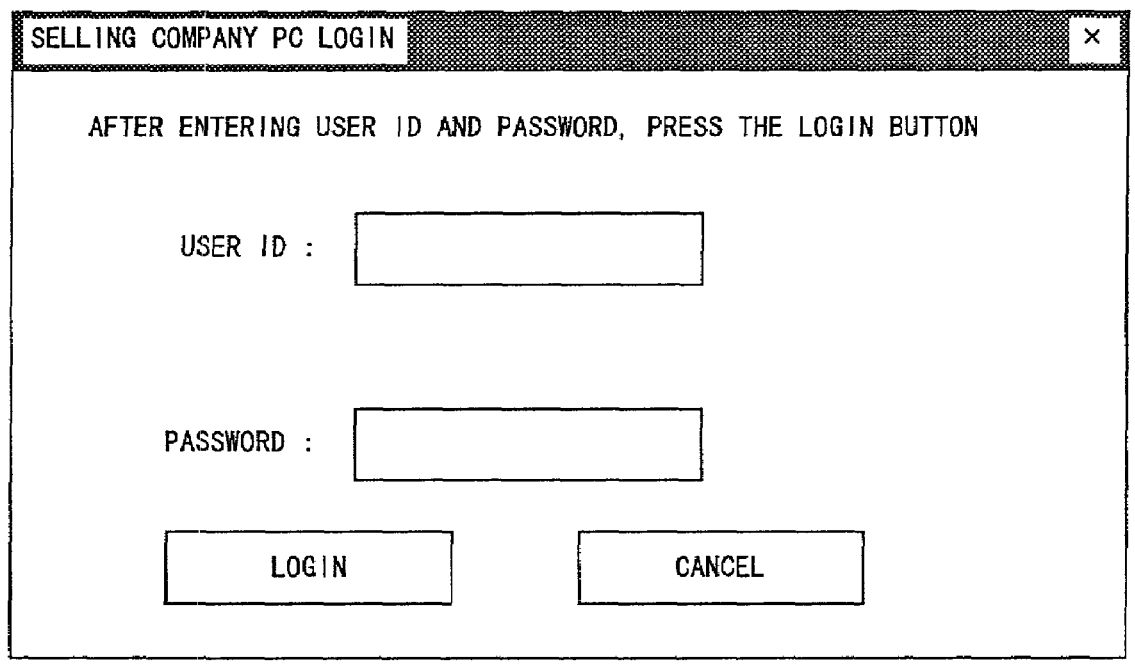
FIG. 27 shows the login screen.

Through this process, a login screen, represented in FIG. 27, appears on the computer 5 (or computer 6, for that matter) display. This login screen is used to open the monitor system in this illustrative embodiment and corresponds to the start screen in FIG. 25. As with the previously described embodiments, entering a user I.D. and password and pressing the login button in the login screen causes computer 5, for example, to confirm the user I.D. and password. If the user I.D. and password are in agreement, the system transitions to menu display and brings up the menu screen. Pressing the cancel button returns the system to the previous, initial operating system screen.

Figure 28:
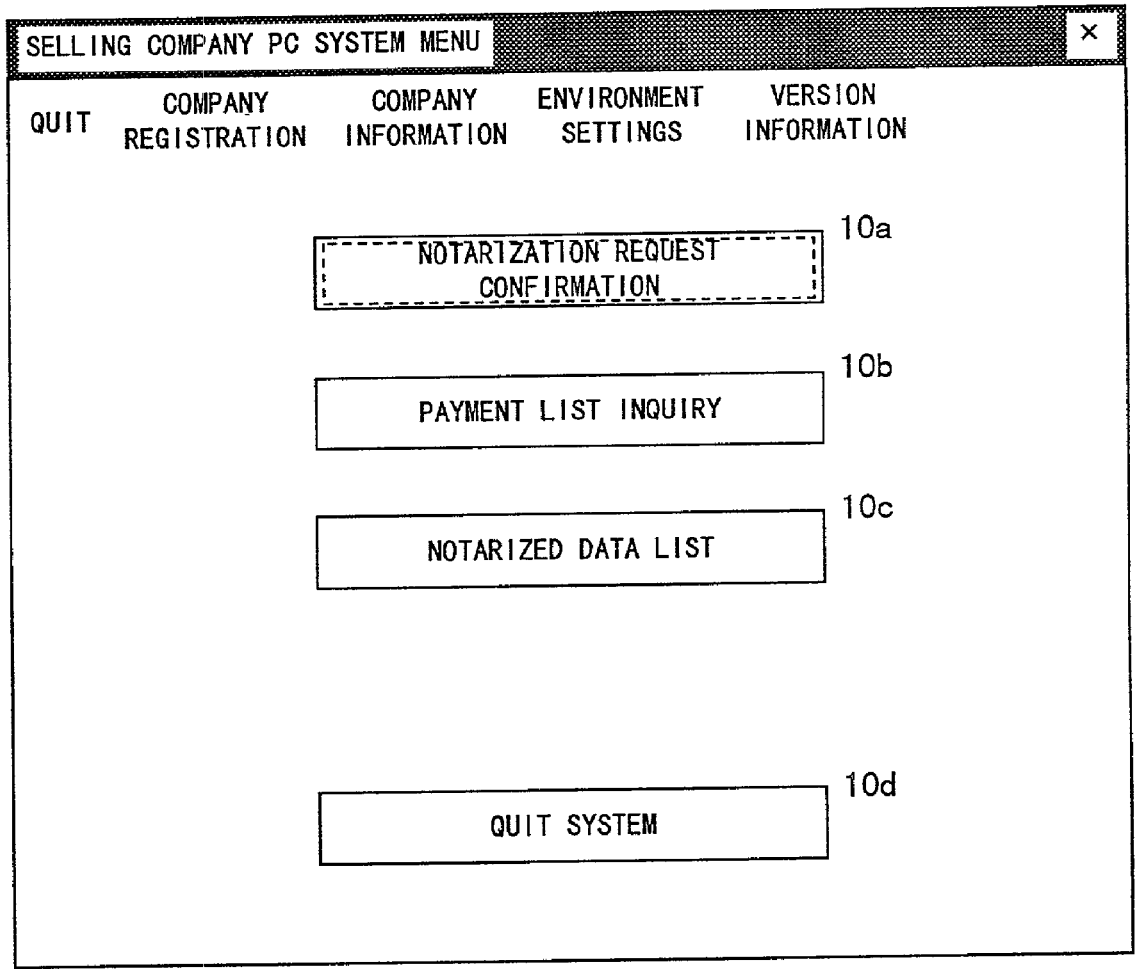
FIG. 28 represents a screen displaying the start menu.
Figure 29:
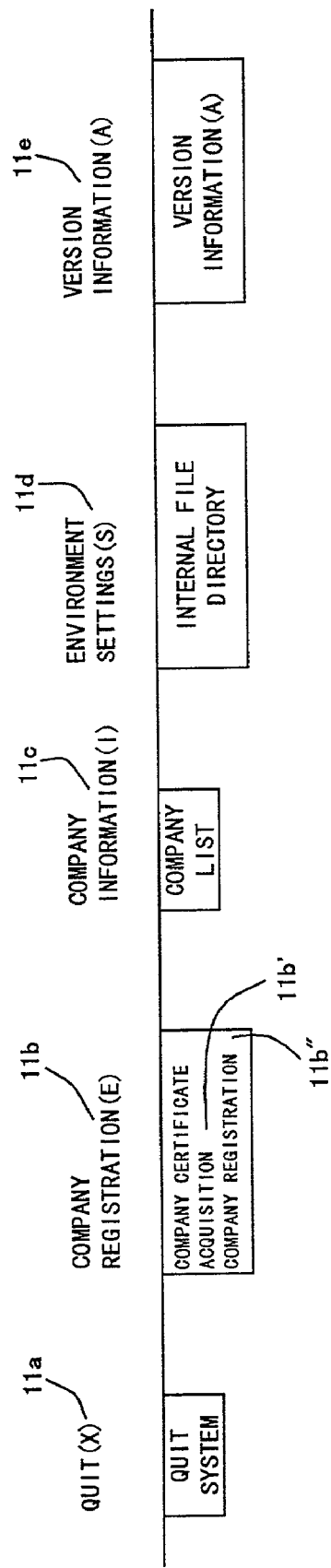
FIG. 29 discloses the menu bar details.

FIG. 28 represents the initial menu screen displayed when the login button is pressed. The initial menu comprises four buttons (display), 10*a* through 10*d*, and menu bar 11. FIG. 29 discloses details of the menu bar 11. Button 10*a* is pressed to instruct the system to confirm notarization requests. Button 10*b* is pressed to instruct the system to retrieve a payment list. Button 10*c* is pressed to instruct the system to list notarized data. Button 10*d* is pressed to quit the program in this illustrative embodiment.

As shown in FIG. 28, The menu bar 11 consists of quit bar 11*a*, company registration 11*b* (company certificate acquisition bar 11*b*', company registration bar 11*b*"), company information bar 11*c*, environment settings bar 11*d*, and version information bar 11*e*. The alphabetic characters (X, E, I, S, A) assigned respectively to each of the bars are used when designations (specifications) are made via the keyboard.

As described above, buying company's computer 5 performs processes A through D, and selling company s computer 6 performs processes E through H. These processes are described specifically below.

Company Certificate Acquisition Processes (processes A through E)

These are processes for admission to the system and must be performed initially when, for example, this system is adopted. Designation of these processes is accomplished by selecting the company certificate acquisition bar in the menu screen shown in FIG. 29 (FIG. 28) and displaying the company certificate acquisition screen shown in FIG. 30. As described above, the company certificate acquisition process (process A) is a process for registering companies participating in the Witness system in the illustrative embodiment and designating company registration numbers for companies whose company certificates are to be acquired, URL for the authentication authority, server name, and the type of certificate.

Next, if there are no problems with respect to the entered company registration I.D., authentication authority's URL, or server name, the certificate request button 12*a* is pressed, producing the confirmation number display screen. When the quit button 12*b* is pressed, the display restores the initial menu shown in FIG. 28.

Figure 31:
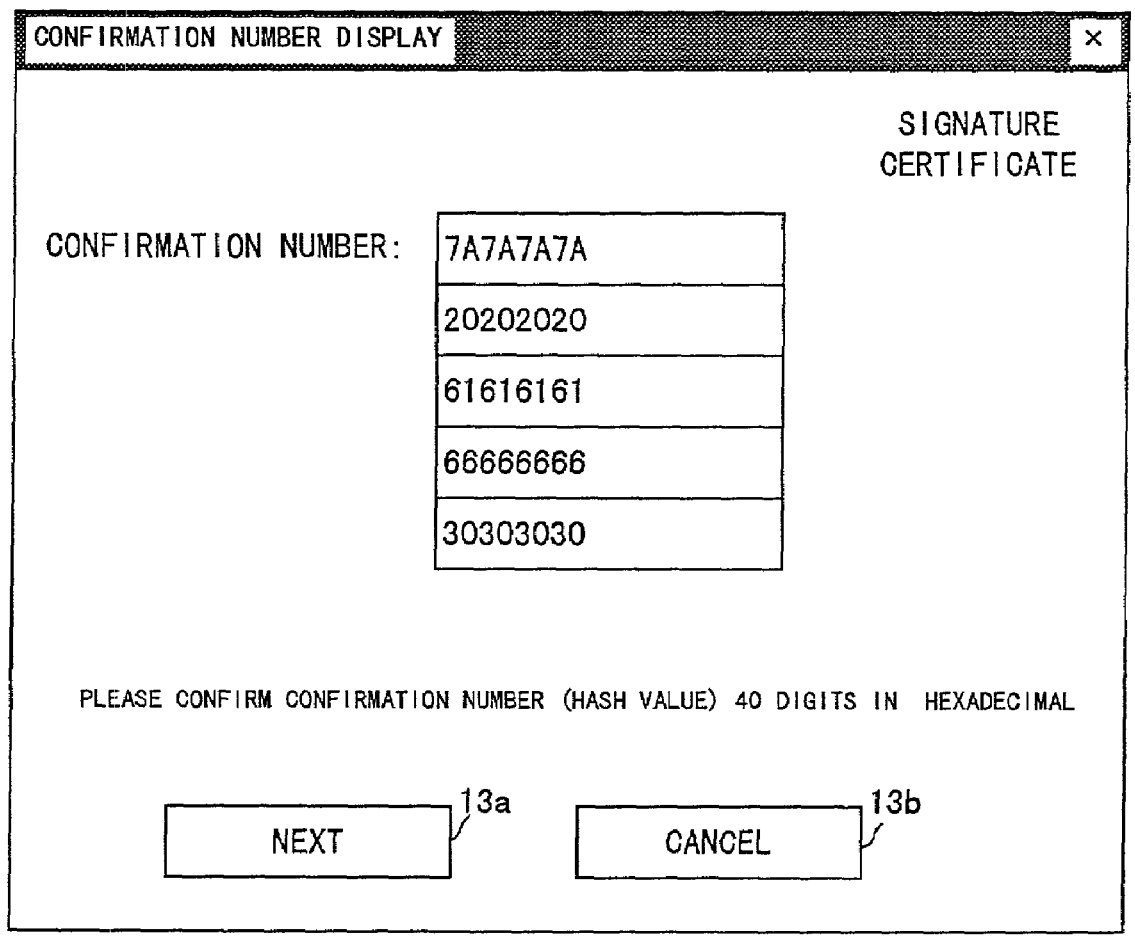
FIG. 31 shows the confirmation number display screen.

FIG. 31 discloses the confirmation number display screen. After confirming the displayed number, the operator presses the "next" button 13*a* and displays the authentication authority terms. In this case, too, pressing the cancel button 13*b* restores the company certificate acquisition screen shown in FIG.

Figure 32:
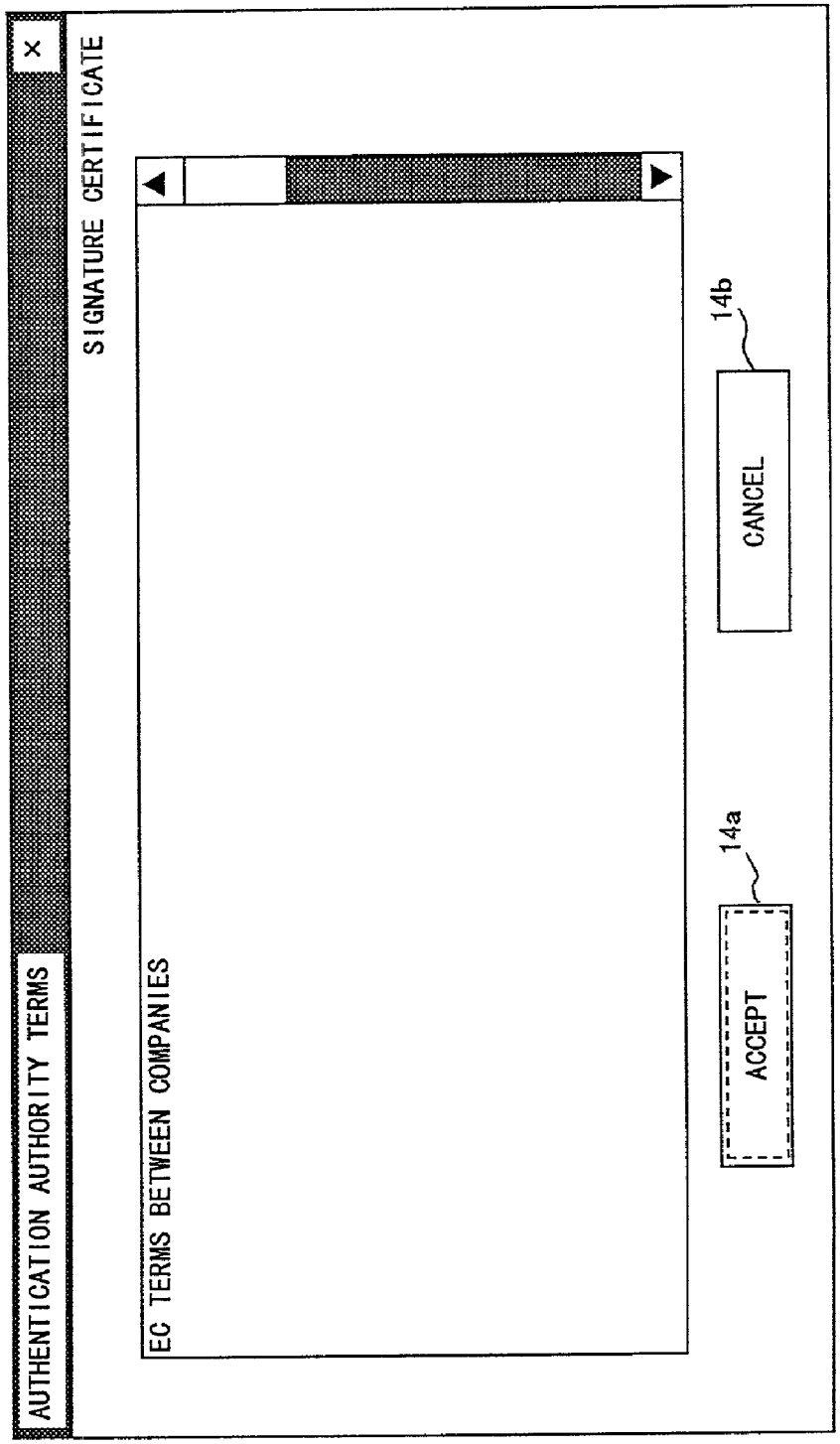
FIG. 32 shows the terms display screen, which displays the authentication authority terms.

FIG. 32 discloses the provisions display screen, indicating the certification authority terms. Among these terms are, illustratively, regulations pertaining to admission to this system. The operator reads the terms and, if the operator agrees therewith, presses the consent button 14, or, conversely, if the operator is unable to agree, presses the cancel button 14*b*. When the acceptance button 14*a* is pressed, the display shifts to the next certificate acquisition screen.

FIG. 33 discloses the certificate acquisition screen. Company name, address, and other information relating to company in question are recorded in the corresponding areas therein, and the application request is made. After confirming that there are no mistakes in each of the entries, the application request is executed by pressing the application request button 15*a*. The aforesaid authentication authority registers the company pursuant to this request.

Company Registration Processing (processes B and F)

Company registration processing is performed after company certificate acquisition processing is completed as described above.

FIG. 34 discloses the company registration screen, which can be displayed by pressing the company registration bar 11*b*" in the start menu. This company registration process registers participating companies with the notarization authority 7 and designates the notarization authority 7 URL, server name, and the monitor I.D. (it is permissible, moreover, to abbreviate the server name and the monitor I.D.). This process also designates company registration I.D. for participating companies.

Next, if there is no problem with, illustratively, the designated company registration I.D., the notarization authority 7 URL, and server name, registration number button 16*a* is pushed, producing the terms screen for the notarization authority 7. Pressing the quit button 16*b* restores the start menu screen.

Figure 35:
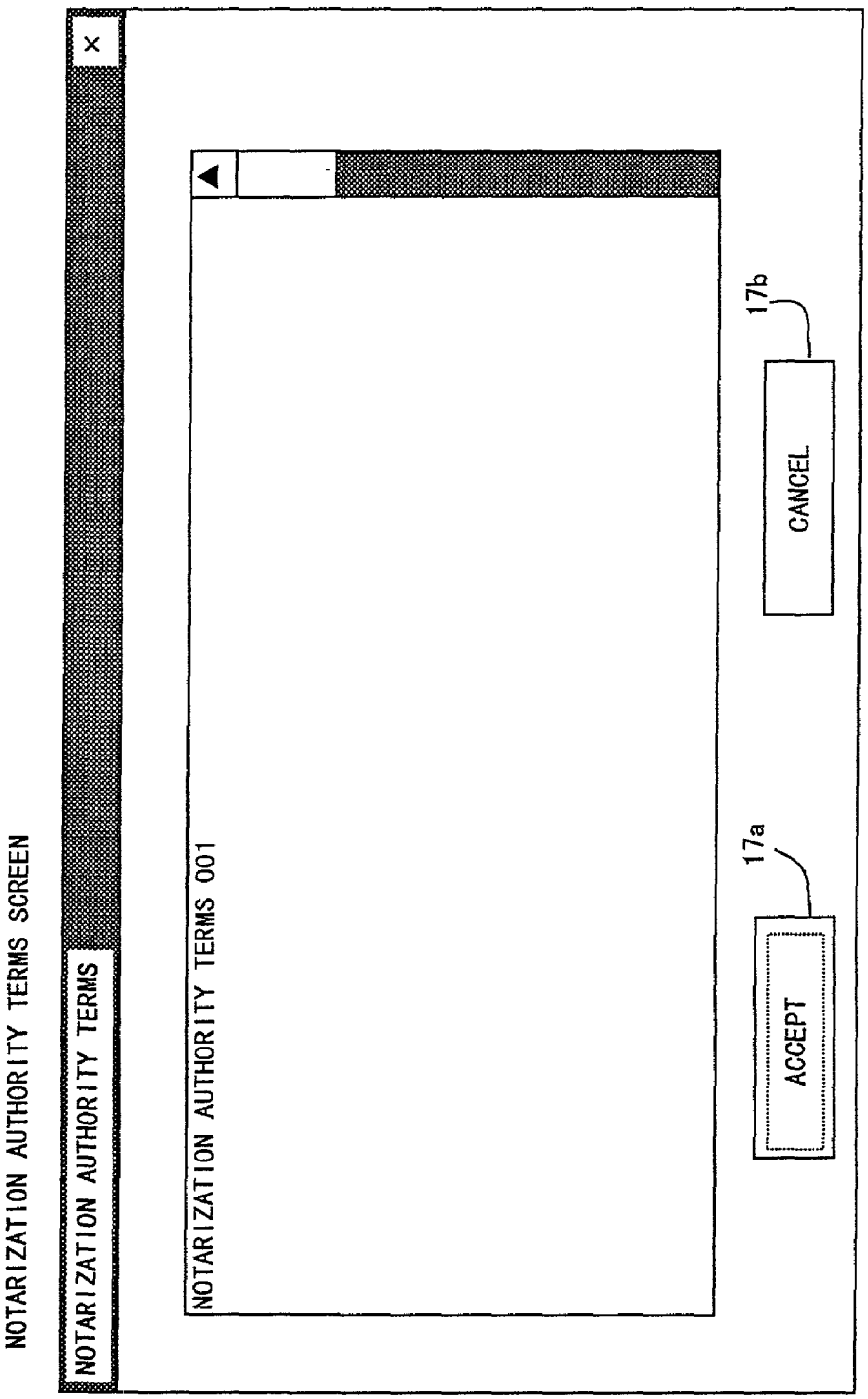
FIG. 35 shows the notarization authority terms screen.

FIG. 35 discloses the notarization authority terms screen. This screen, like that for the certification authority terms, presents, by way of illustration, regulations respecting admission to the system, confirmation items, and like entries. The operator read these terms and, if the operator agrees therewith, presses the consent button 17a, or conversely, if the operator is unable to agree, presses the cancel button 17b. When the consent button 17a is pressed, the display shifts to the next company registration request screen.

FIG. 36 discloses the company registration request screen, through which, company name, address, and other information relating to the company in question are recorded and the application request is executed. After confirming that there are no errors in each of the aforesaid entries, the request is executed by pressing the application request button 18a (the cancel button 18b is pressed to terminate the request process).

The notarization authority 7 registers companies with the Witness server, pursuant to the above-described process.

Company List Display

Once each company has, as described above, executed registration with the notarization authority 7 and the authentication authority 8, registration data for a plurality of companies are registered in the Witness server 9. Then, pursuant to user designations, the system is capable of displaying a list of registered companies.

This company list is displayed by pressing the company information bar 11c from the start menu. FIG. 37 discloses the registered company list display screen, on which is displayed registered company I.D., company name, and registration date. In this illustration, company name "OO Foods Company" has been registered in area 1, company name "XX Ham Company" in area 2, and "ABC Company" in area 3. If there exists a company that a user wishes to examine in greater detail, the user specifies the company name and presses the detail button 19a, after displaying the above-described screen.

FIG. 38 discloses the company detailed information screen that is displayed by pressing detail button 19. This display consists of company I.D., company name, address, signature certification information, and encoding certificate information. If, for example, the company name "ABC Company" registered in area 3 (se FIG. 28) is selected, the I.D. for "ABC Company" is registered in the company I.D. area, and the address for "ABC Company" is registered in the address area. Information to be registered with the "ABC Company" notarization authority is displayed in the signature certification information area, and the user can observe, for example, that certificate number 20 was issued on Nov. 9, 1997, and that a registration valid through May 10, 1998 has been executed.

When the authentication process for companies participating in the system (e.g., buying company 1 and selling company 2) is completed, an encoding process is next performed.

Notarization Request Process (Process C)

This is a process performed by buying company 1 and is carried out based on such seller records as a delivery voucher, an order voucher, or an invoice. Specifically, it is a process wherein buying company 1 makes notarization documents, based on any one of the vouchers sent to it by selling company 2, and seeks notarization from the Witness 3.

Figure 39:
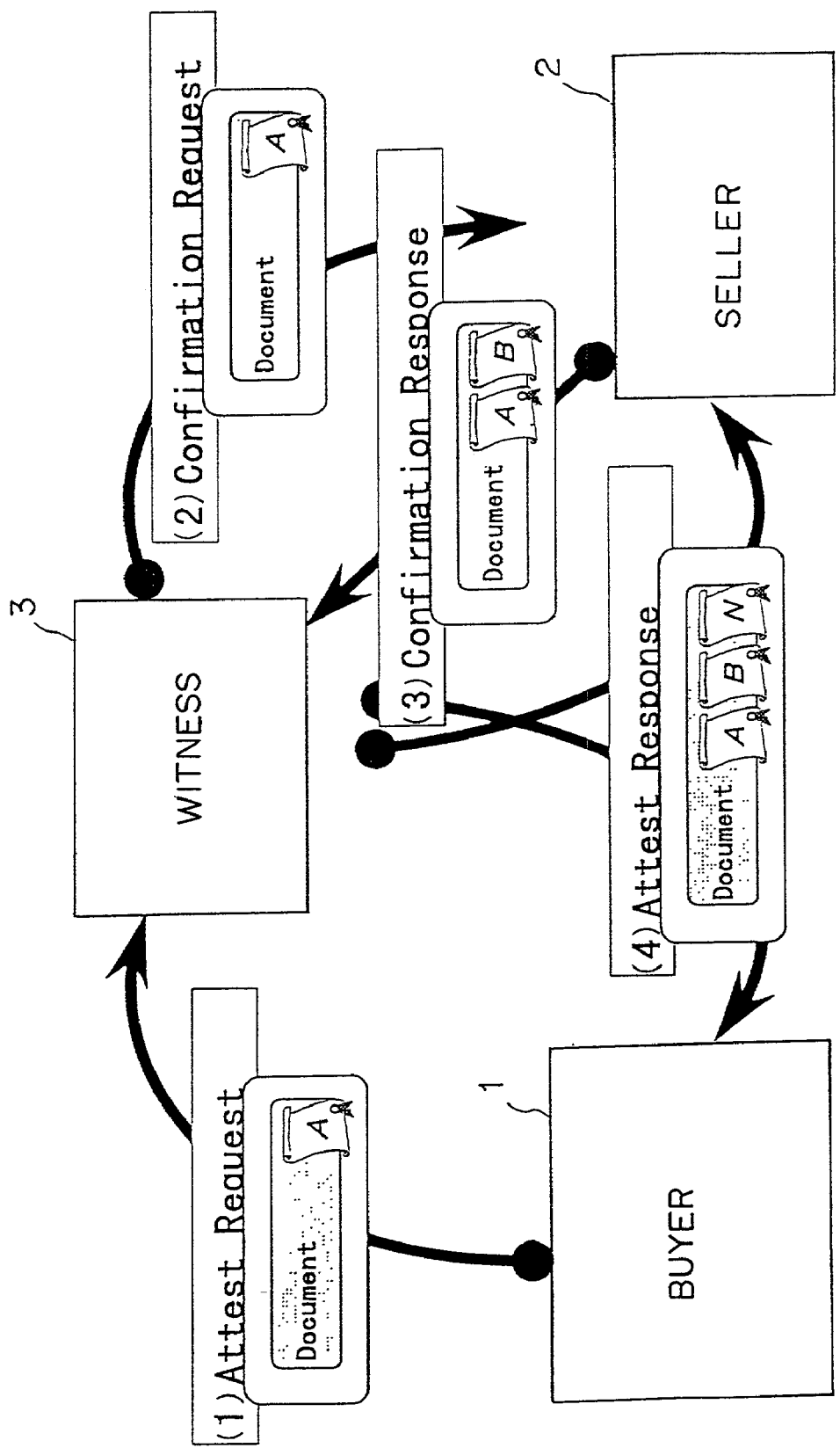
FIG. 39 describes a Witness system utilizing a certificate.

It is FIG. 39 that specifically describes this process. FIG. 39 is a scaled representation of the authentication process, which is executed by attaching the above-described certificate received by buying company 1 and selling company 2. Buying company 1 appends to the authentication document the certificate [A] for buying company 1 and sends these documents to the Witness 3 (process (1) in FIG. 39). The Witness 3 sends the authentication documents thus received, as is, to selling company 2 for confirmation (process (2) in FIG. 39). Selling company 2 checks the documents sent to it and, after confirming, illustratively, that the documents are in agreement with the content of a delivery voucher, attaches its certificate [B] and sends the documents to the Witness 3 (process (3) in FIG. 39). In addition to registering the authentication document data in the receipts detail table 20, the Witness 3 sends to both buying company 2 and selling company 1 notification that the Monitor has authenticated the authentication documents (process (3) in FIG. 39). This process is executed by appending the Witness' 3 certificate [C]. By thus appending the certificate to each document forwarded, the notarization authority 7 (Witness 3) is at once able to confirm at all times that the documents are those of companies eligible to participate in the system and to execute safe procedures.

Figure 40:
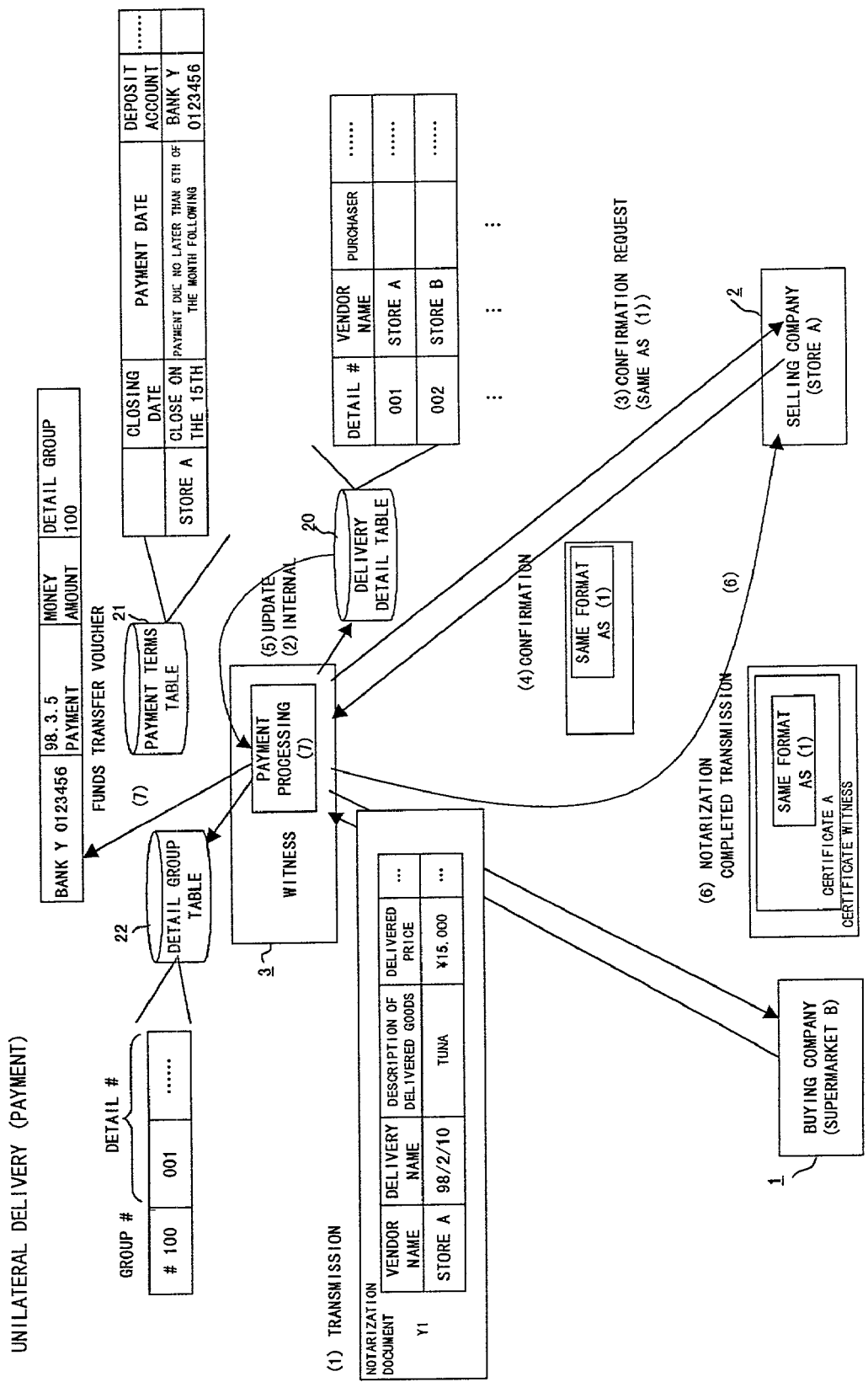
FIG. 40 describes specifically the second alternate embodiment.

FIG. 40 is used to advance a specific explanation.

First, store A delivers foodstuffs to supermarket B, the buying company, and contemporaneously sends (or tenders on site) a delivery voucher. Selling company 1 (supermarket B in this example) prepares data for use as a notarization document Y. Included in the notarization document Y are the deliverer's name (selling company 2 in this example), delivery date, description of delivered goods, and delivery price. Illustrative entries are as follows: deliverer's name/"store A"; delivery date/"Feb. 10, 1998"; description of delivered goods/ "tuna"; delivery price/"15,000 yen". The notarization document Y is transmitted from buying company 1 to the Witness 3 (see FIG. 40(1)). The notarization document Y sent from buying company 1 to selling company 2 is first encoded.

Figure 41:
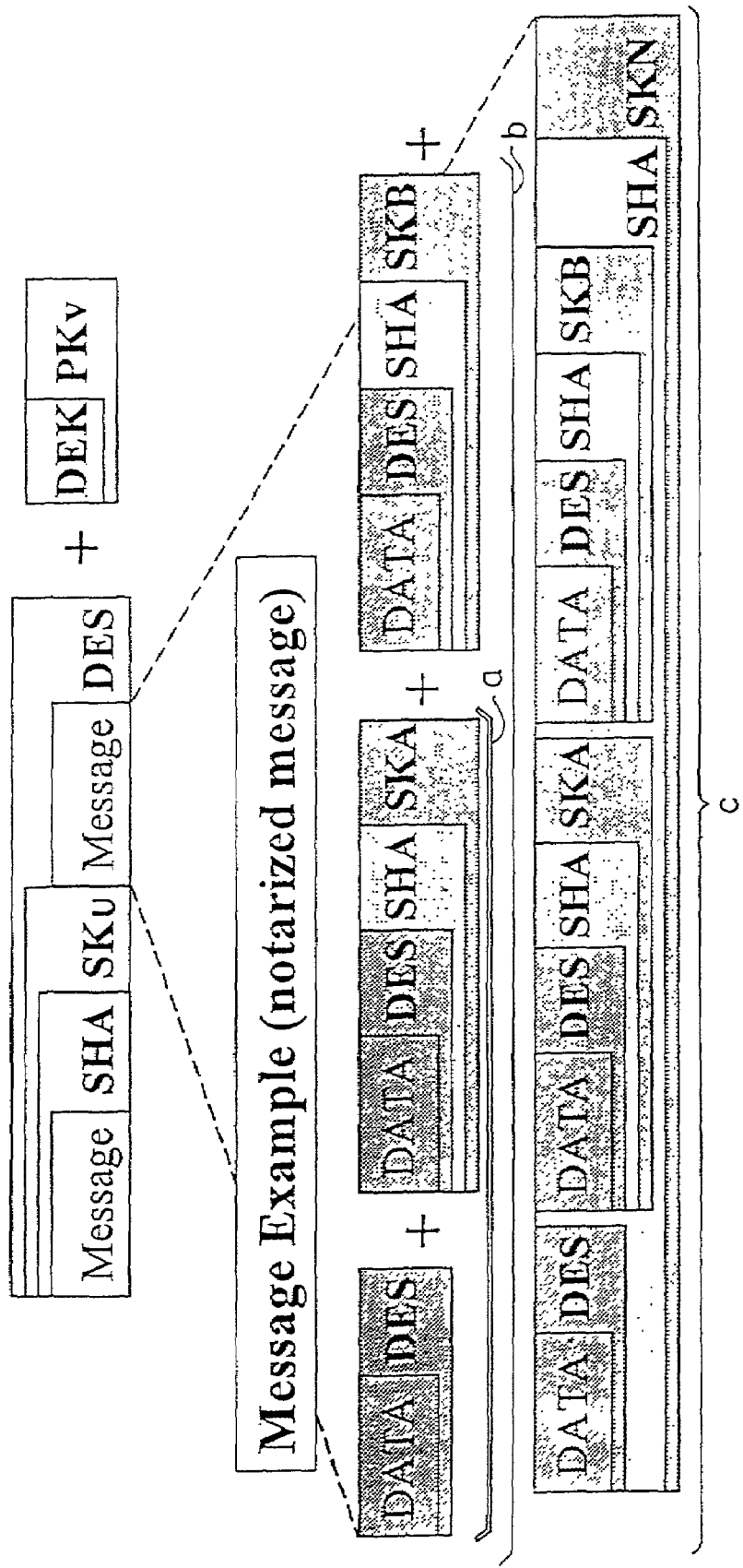
FIG. 41 describes the data format for encoded data.

FIG. 41 is representative of this process. Here, a notarization document Y is sent from company U to company V. Adapting this scenario to the above illustration, the portion shown as "a" in the figure corresponds to a message relating to the sending of notarization document Y from buying company 1 to selling company 2. Specifically, DATA shown in FIG. 41 corresponds, illustratively, to the deliverer's name and delivery date data, mentioned above. These data are encoded by means of DES, a hash function (SHA) is applied, further secured with buying company's secrecy key (SKA), and sent to the notarization authority 7. A pubic access key (PKA) for the (SKA) is also sent with the data. The data are secured with buying company's secrecy key (SKA) to enable confirmation at selling company 2 that the message has been sent.

The totality of transmission data sent from company U to company V is secured by locking with company U's secrecy key (SKU) a (message) to which a hash function (SHA) has been applied. This is further locked by DEK, which, in turn, is further secured by locking DEK corresponding to DES with company V's public access key (PVK). Locking with company V's public access key (PKV) ensures that the body of transmission data is susceptible of deciphering by company V only. Specifically, the body of transmission data is sent from buying company 1 to selling company 2.

Notarized Data Confirmation Process (Process G)

Next, the Witness 3 sends the aforesaid notarization document Y to selling company 2, the sender of the delivery voucher, and executes a confirmation request (see FIG. 40(3)). Selling company 2 compares the content of the notarization document Y transmitted from the Witness 3 with, illustratively, the content of a delivery voucher that selling company 2 itself issued, checking for errors. The above-described data is unlocked by means of the aforesaid public access key.

Selling company 2, which has received the totality of transmission data, first unlocks the data with the secrecy key (SKV) corresponding to the public access key (PKA), obtains the DEK, unlocks the DES by means of the DEK, and then, as described above, utilizes buying company's public access key.

The confirmation task is, as above explained, performed by selling company 2. A buying company to which selling company 2 delivers goods is, however, not limited to the company prescribed above (buying company 1). Accordingly, when performing the aforesaid confirmation task, selling company 2 presses the notarization request confirmation button 10a in the computer 6 start menu (see FIG. 28), thereby displaying the notarized data list screen, disclosed in FIG. 42.

FIG. 42 illustrates a scenario wherein "supermarket B" is selected by manipulating the search button 20a on the notarized data list screen. To confirm this certificate, selling company 2 presses detail button 20b, thereby displaying a detail screen.

When the detail button 20b is thus pressed and the detail screen displayed, the detail screen depicted in FIG. 42 appears. While observing this screen, selling company 2 confirms the content of the notarization document Y1, transmitted to it from the monitor 3, with the content of, illustratively, a delivery voucher that selling company 2 itself issued, checking for errors. If the contents are in agreement, OK button 21a is pressed, and a completion (message) is transmitted to the Witness 3 (see FIG. 40(4)).

The confirmation response sent by selling company 2 to the Witness 3 corresponds to that which is designated "b" in FIG. 41. Specifically, the encoded data for the aforesaid notarization document Y1 is secured by means of a hash function (SHA) and selling company's secrecy key (SKB), and then sent to the notarization authority 7. A public access key (PKB) corresponding to the secrecy key is sent simultaneously to the notarization authority 7.

If it is determined that the content of the notarization document Y1 is not in accord with, illustratively, the content of a delivery voucher, confirmation NG button 21b shown in FIG. 43 is pressed, resulting in the display represented in the same figure. Specifically, the operator describes the reason the reason for NG and presses OK button 22a. In this case, the Witness 3 notarizes no details, and, at this point, Seller 2 learns that there is an error, or that there are errors, in the details prepared by Buyer 1. Seller 2 notifies Buyer 1, and, as the content of the details are revised, the receipts detail table 20, for example, is updated, thereby enabling Buyer 1 to produce accurate notarization details (see FIG. 40(5)).

Once the Witness 3 has a confirmation response from selling company 2, it transmits to selling company 2 and buying company 2 a confirmed certificate relating to the notarization document Y1 (see FIG.

The certificate that selling company 2 sends at this time to the Witness 3 corresponds to that which is designated as "c" in FIG. 41. Specifically, it is a message secured by means of (1) a hash function (SHA) applied to encoded data relating to notarization document Y1 and (2) the monitor's 3 secrecy key (SKN). An access key corresponding to said secrecy key (SKN) is at this time sent to both buying company 1 and selling company 2.

Thus, decoded information sent from the Witness 3 constitutes a certificate that has been confirmed mutually by buying company 1 and selling company 2, and further constitutes a notarization document certifying that there are no substantive errors in the authentication document based, illustratively, on a delivery voucher. As the notarization process is thus completed, a plurality of certificates are registered in the receipts detail table 20.

System users can consult notarized, registered data residing in the receipts detail table 20 by pressing start menu (see FIG. 28) button 10c, which enables viewing of the notarized data list. The resulting notarized data list screen is disclosed in FIG. 45. The notarized data list screen allows the user, for example, to select "customer" and then specifically identify, illustratively, "OO Foods Company", "XX Ham Company", "ABC Company", or any buying company 1 with which the selling company currently has transactions. The user can also select matters that the user wishes to confirm by specifying items in the classification areas "wholesale", "set-off", "orders", "accounts receivable", "payment corrections", and "contracts". Pressing detail button 25 displays the notarized data detail screen shown in FIG. 46.

FIG. 46 represents the detail screen displayed when the classification item "orders" is selected. As shown in FIG. 46, detailed information for the selected item is displayed, facilitating review of specific authentication details including, illustratively, product name, quantity ("10 pieces" in this example), unit price ("100 yen" in this example), and total price ("1000 yen" in this example).

Office Administrations Processes (Processes D and H)

Next, the specification describes the office administration processes. Among the office administration processes (process D) are payment correction, payment detail display, and various varieties of like processes. Payment correction facilitates correction, for example, to the price or description of goods appearing in the authentication document, pursuant to notification of error received from selling company 2. Price settlement includes, for example, a response process executed by confirming detailed payment statements prepared by the Witness 3, and a process wherein detailed payment statements prepared by buying company 1 itself are output. These processes are explained specifically below.

FIG. 47 discloses, by way of illustration, the payment list screen appearing on the computer 5 display. This payment list screen is displayed by pressing the payment list inquiry button 10b in the start menu, shown in FIG. 30. The payment list screen is generated by the Witness 3, and, by selecting the payor, the user can select, for example, "OO Foods Company", "XX Ham Company", "ABC company", or any payor with whom the user conducts business. Also, when a payee is in the same way designated and a date specified, that date is displayed as the payment date in the payment list.

The delivery date relating to the payment voucher, voucher number, store name, wholesale price, and discount rate, are displayed on this detailed list screen. By specifying a payment voucher about which more information is desired and pressing detail button 24a, the operator can shift to the detail screen represented in FIG. 48.

FIG. 48 is an illustrative screen showing a payment voucher requiring payment from payor "OO Foods Company" to payee "XYZ Company" not later than Aug. 12, 1997. With this information displayed, the buying company 1 operator, or the selling company 2 operator, investigates product name, unit weight, quantity, unit price, total price, and like information, and, in case of any doubt, confirms each detail registered in the aforesaid receipts detail table 20. If, for example, the total amount differs from the amount determined based on the delivery receipt in the operator's possession, the operator checks each detail registered in the receipts detail table 20.

In this case, the operator would review the notarized, registered data residing in the receipts detail table 20. Specifically, the operator displays the aforesaid list screen shown in FIG. 45, by pushing the notarized data list button 10c from the start menu shown in FIG. 28. Further, the operator can display the notarized data detail screen and review payment data.

The detailed payment statement, which, by way of illustration, can be prepared by the Witness 3, is produced with reference to the payment terms table 21. Due date, payment date, receiving account, and like information are for each company registered in the payment terms table 21, by prior arrangement between buying company 1 and the Witness, or between selling company 2 and the Witness 3. Furthermore, each detail is assigned a detail number in the receipts detail table 20, and, for convenient review by either buying company 1 or selling company 2, a group table 22, grouping detail numbers, is prepared.

Figure 50:
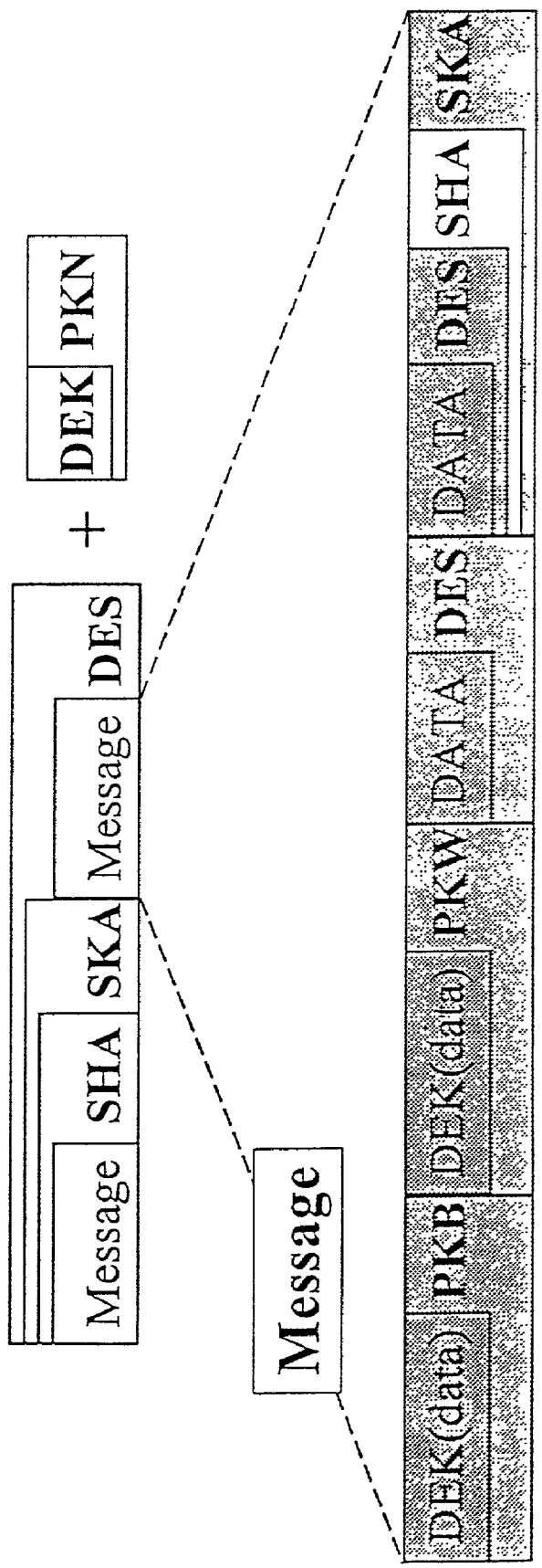
FIG. 50 discloses examples of other encoded data.

Based on the aforesaid detailed payment statement, the Witness 3 next specifies the accounting department (i.e., a designated bank) receiving account and executes a funds transfer request (see FIG. 40(')). FIG. 50 describes the funds transfer process.

Figure 49:
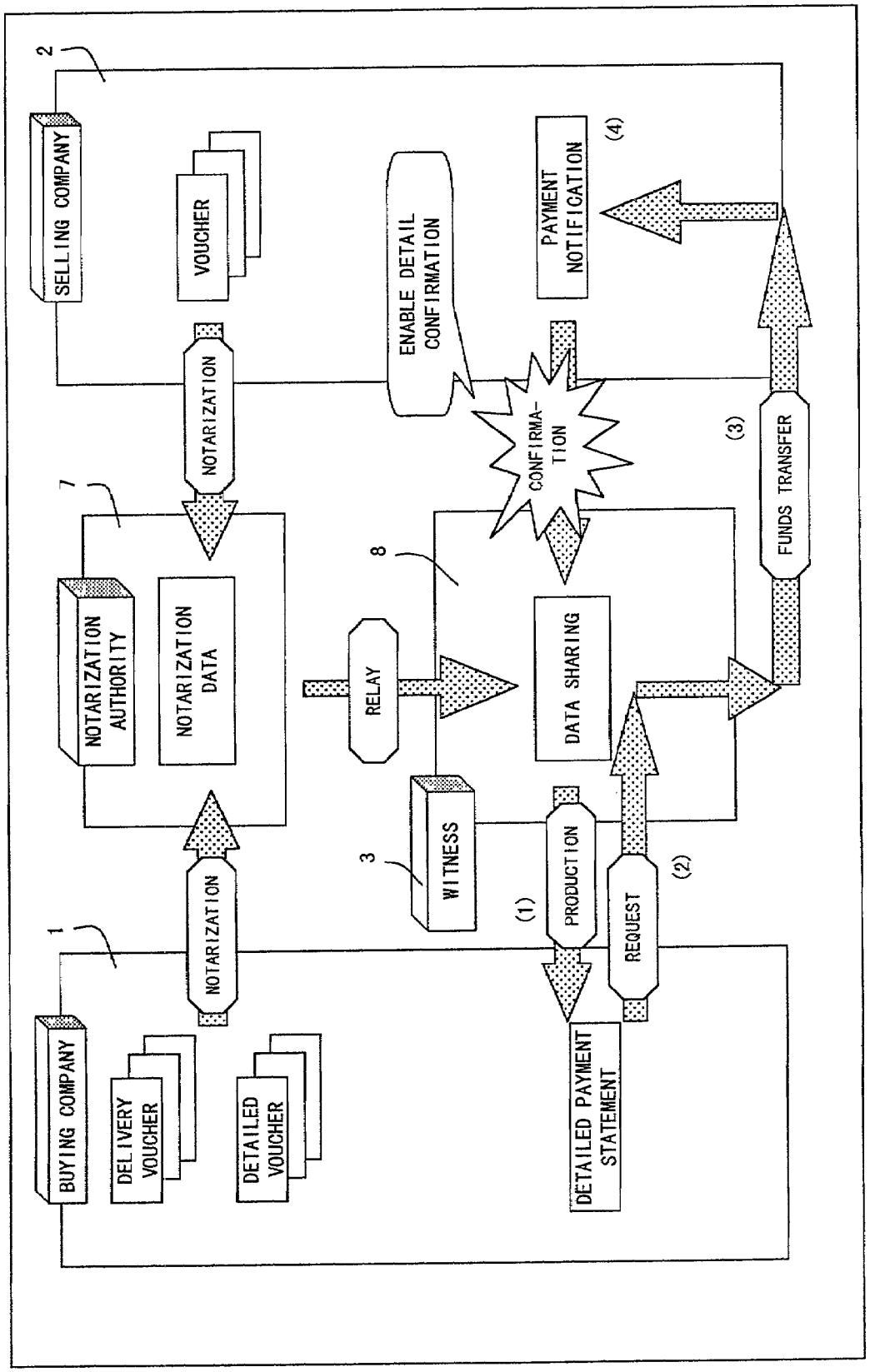
FIG. 49 describes the account settlement system in the case of funds transfer.

The Witness 3 prepares the detailed payment statement based on the data registered in the receipts detail table 20 and requests confirmation from buying company 1 (see FIG. 49(1)). Buying company 1 confirms the detailed payment statement sent to it by the Witness 3 and returns said detailed payment statement as a funds transfer request (see FIG. 49(2)). At this time, a delivery voucher index corresponding to the detailed payment statement in question is assigned to said detailed payment statement.

The above-described funds transfer request is delivered to the Witness 3, via the notarization authority 7 (see FIG. 49 (3)), and transmitted to the bank, which is not represented in the instant figure. The funds transfer instruction sent by the Witness 3 to the bank consists of the money amount, transferor, transferee, and the detail index. Having received the funds transfer instruction, the bank transfers funds to the appropriate account at selling company's transacting bank, utilizing a suitable banking system (e.g., the inter-bank exchange system described above). The paying bank issues a payment notification to selling company 2 (see FIG. 49(4)).

By performing processing as described above, buying company 1 and selling company 2 are not required to hold several delivery vouchers and invoices and can execute efficient account settlement processing by sharing and using information provided by the Witness server 9.

Data transmitted (sent and received) among buying company 1, selling company 2, the notarization authority 7, and the Witness, are encoded and prepared as necessary to suit their respective transmission purposes. The illustrative data shown in FIG. 50 are prepared for the purpose of substantive disclosure by buying company I [A] to both selling company 2 [B] and the Witness [W]. In this case, the data have been (locked (secured) in advance with the selling company's public access key (PKB), which is held by buying company 1, and the Witness' public access key (PKW). The data are further secured with a hash function and buying company's secrecy key (SHA), and then sent with a public key (PKN) appended thereto. This structure makes it impossible to release the aforesaid data without both selling company's secrecy key and the Witness' 2 secrecy key, and knowledge of the information is thus strictly limited to selling company 2 and the monitor 3.

Although the explanation of this illustrative embodiment does not touch upon the set-off process, said process can be implemented as set forth in the description of the previous illustrative embodiment.

Third Alternate Embodiment:

This portion of the specification describes the third alternate embodiment.

This illustrative embodiment is directed particularly to account settlement by means of check or draft (note), and can be implemented through systems based on both the above-described preferred and first alternate embodiments. Each contingency, viz., check and draft (note), is explained below.

Figure 51:
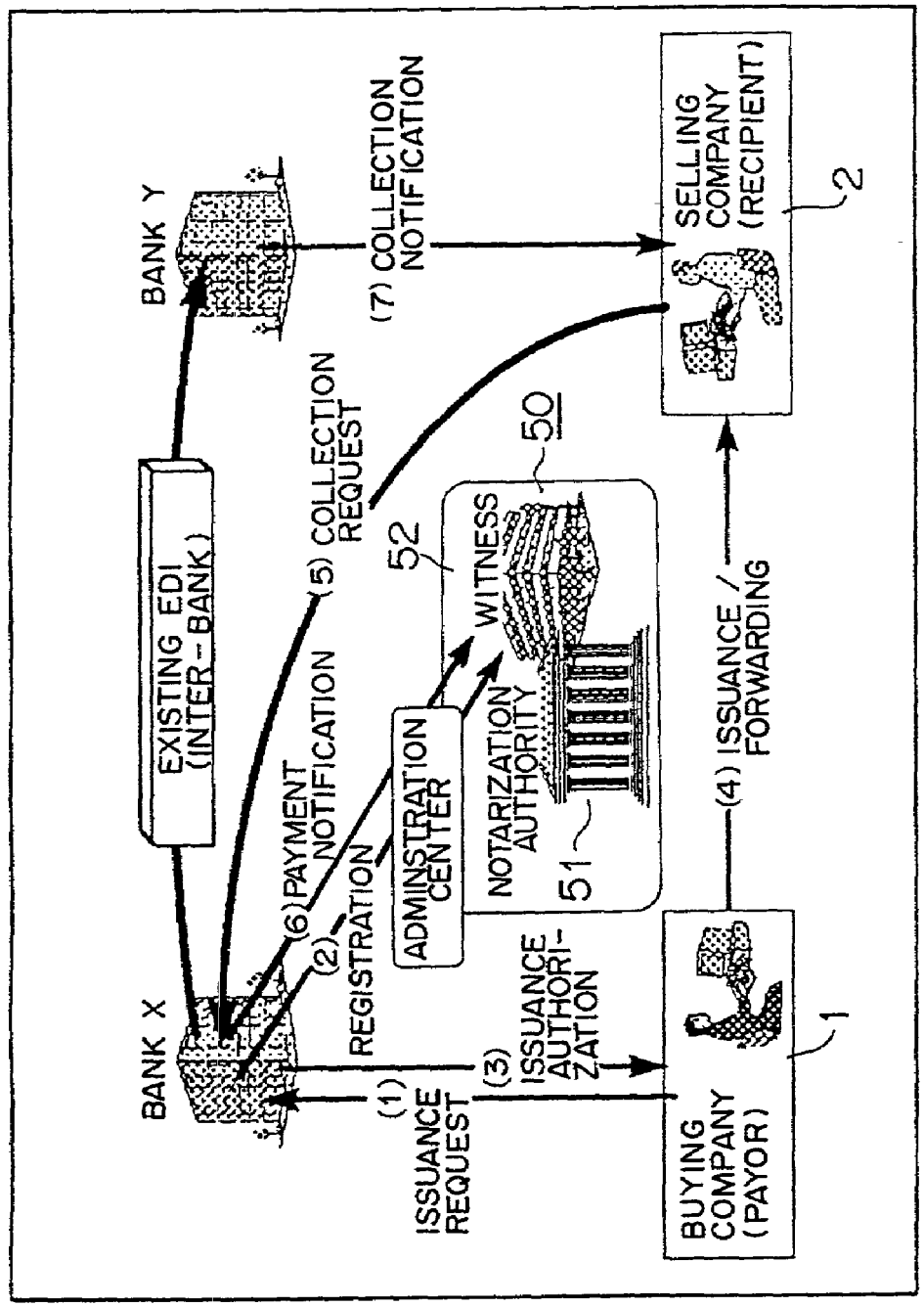
FIG. 51 describes processing in the case of payment by check.

FIG. 51 describes, illustratively, account settlement in the case of checks. The administration center 50 shown in said figure comprises a notarization authority 51 and the Witness 52. The administration center adopts the Witness system described above and also undertakes management of bank-issued checks. Bank X represents the transacting bank for payor/buying company 1, and bank Y represents the transacting bank for receiver/selling company 2.

First, buying company 2 (payor) issues a check. In the illustrative case, buying company 3 (payor), wishing to issue a check in payment for goods, must obtain a check by requesting that its transacting bank X issue a check (see FIG. 51(1)). Bank X examines the applicant's eligibility and, when it is determined that a check ought to issue, the bank registers with the administration center 50 the issuance of a check to buying company 1 (see FIG. 51(2) and simultaneously authorizes buying company 1 to issue a check (see FIG. 51(3)).

Having so obtained the check, buying company 1 uses the check in payment for goods and tenders the check, on which are recorded the payee's name and the money amount, to selling company 2 (payee) (see FIG. 51(4)). Selling company 2 takes the check it has received to the aforesaid transacting bank X and requests payment (see FIG. 51(5)).

Transacting bank X inquires of the administration system regarding the check presented to it and, in addition to confirming its validity, registers said check as paid by means of a payment notification (see FIG. 51(6)). Transacting bank X thereafter utilizes an inter-bank system to move funds to the specified account at the designated transacting bank (bank Y in this illustration), and bank Y then dispatches to selling company 2 notification of collection (see FIG. 51(7)).

In this illustrative embodiment, the administration center is composed of a notarization authority and a Witness (system). The system undertakes check administration in the above-described network. Selling company 2 is the entity requesting that funds be transferred to bank Y.

Processing of Drafts (Notes)

This portion of the specification explains the embodiment in the case of drafts (notes).

Figure 52:
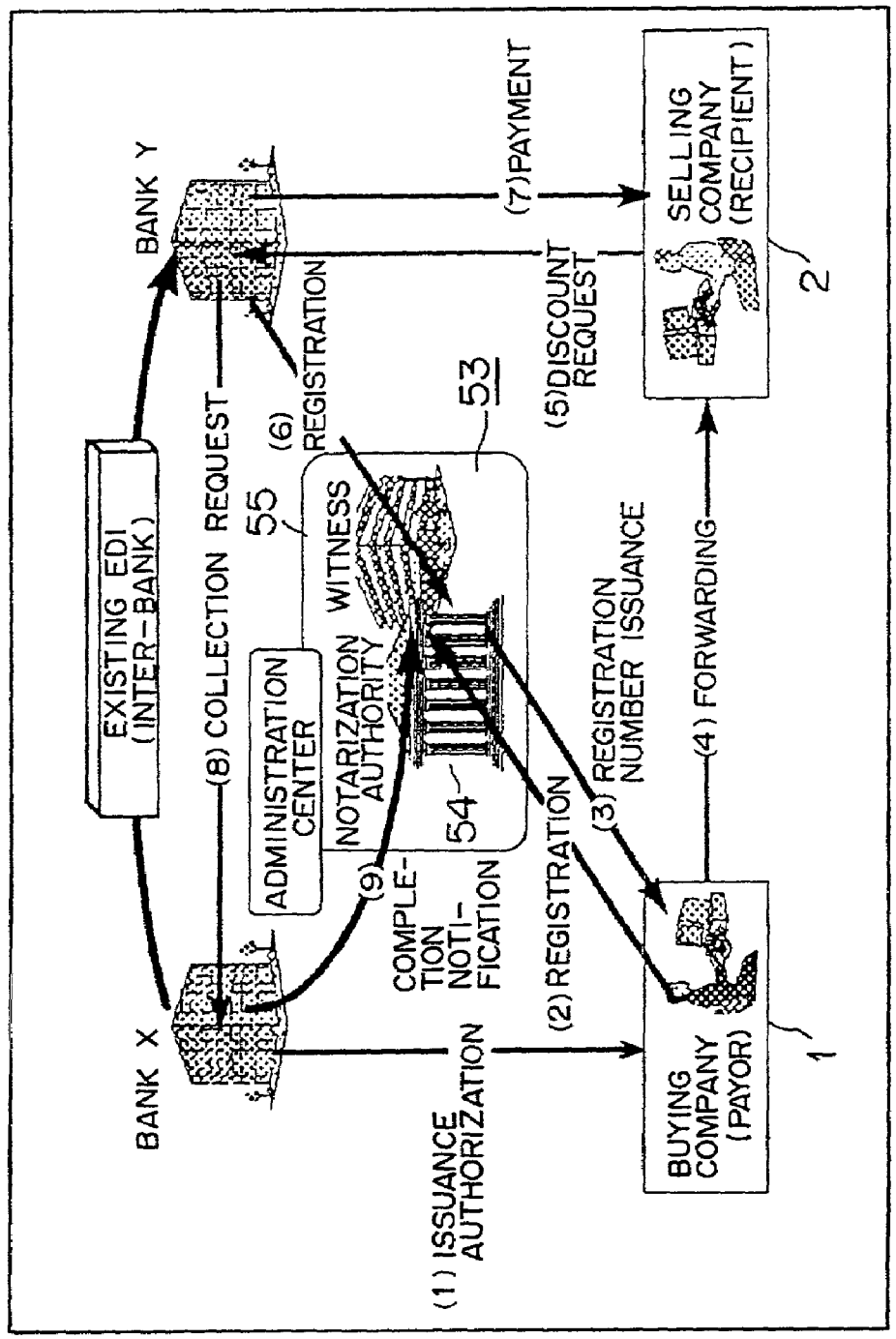
FIG. 52 describes processing in the case of payment by draft (note).

FIG. 52 describes, illustratively, account settlement for drafts (notes). As in the check processing system, here, also, the administration center (53) is composed of a notarization authority 54 and a Witness 55. The administration center adopts the above-described Witness system and also undertakes administration of bank-issued checks. Bank X represents the transacting bank for buying company 1/payor, and bank Y represents the transacting bank for selling company 2/payee.

First, buying company 1 receives from transacting bank X authorization to issue a draft (note) (see FIG. 52(1)). Next, buying company 2 registers issuance of a draft with the administration center 53, at the time buying company desires to issue said draft (see FIG. 52(2)). The administration center 53 registers this information and notifies buying company 1 of the registration number (see FIG. 52(3)).

Buying company 1 adds to the registration number it has received a draw date, a drawee (payor), and a drawer (payee), and sends this information to selling company 2 (drawer) (see FIG. 52 (4)). Selling company 2 presents this draft (note) to its transacting bank, bank Y in this example, where it might request that bank Y purchase the draft (note) at a discount (see FIG. 52(5)).

Bank Y confirms the information in said draft (note) with the administration center 53 and, further, registers with the administration center 53 the fact that bank Y itself is to be the drawer (payee) (see FIG. 52(6)). Also, bank Y pays a discounted amount to selling company 2 (see FIG. 52(7)).

Lastly, as the (payment) date approaches and the draft (note) is converted into currency, a settlement demand is tendered to the issuing bank (see FIG. 52(8)), and bank X, which receives the settlement demand, uses the aforesaid inter-bank exchange system to move funds to the account at bank Y. Bank Y then provides notification of completion to the administration center 53 (see FIG. 52(9)).

The administration center 53 for processes executed in this illustrative embodiment comprises a notarization authority 54 and a Witness 55. The draft (note) administration flow for this illustrative embodiment, also, is performed as described above. The Witness system can be used for this illustrative embodiment, as well.

The following benefits are derived from the present invention. Through means of a single invention, the Witness stores (stores in memory/holds in memory) and manages data relating, illustratively, to order vouchers and delivery vouchers, thus facilitating the preparation of accurate detailed payment statements. Additionally, because both Buyer and Seller can freely review detailed payment statements so prepared, it is not particularly necessary for Buyer or Seller to hold order vouchers and delivery vouchers. It is therefore unnecessary to perform the complicated task of arranging (organizing) various vouchers.

In contrast to conventional settlement methods wherein Buyer prepares payment details while confirming order vouchers or delivery vouchers, it is no longer necessary for Seller to undertake the difficult task of confirming said payment details. Furthermore, system safety is ensured because eligibility to participate in the system is verified, and because the exchange (transfer) of information is executed with encoded data.

What is claimed is:

1. A witness system to assist a buyer and a seller after at least one sale operation has been agreed upon when an offer and acceptance have occurred, comprising:
    confirmation document making means for making a confirmation document by the buyer for each one of a plurality of received seller records sent from the seller to the buyer, each seller record including sales data about one or more items sold by the seller to the buyer, the buyer generating a confirmation document corresponding to each seller record, and each confirmation document indicating a selected sale and corresponding sales data of at least one item among the plurality of seller records;
    witness receiving means for receiving each confirmation document from the buyer after the buyer makes each confirmation document;
    confirmation means for confirming by the seller that the content of each of the seller records is in agreement with the content of a corresponding one of the confirmation documents sent to the seller from the witness receiving means, wherein said witness receiving means certifies and registers each confirmation document as being accurate once said confirmation means confirms each confirmation document; and memory means for storing in memory the confirmation documents registered by said witness receiving means, and
    wherein the witness system responds to any subsequent inquiry of the buyer or the seller relative to the selected sale using the stored confirmation documents,
    when said confirmation documents are sent from said seller to said witness receiving means, said documents are registered and the fact that said documents are registered is confirmed, and
    when said contents do not agree, as determined according to said confirmation means, said witness receiving means is notified of the substantive disagreement.

2. A witness system according to claim 1, wherein a buyer makes said confirmation documents.

3. A witness system according to claim 1, wherein when said witness receiving means confirms the confirmation documents, said witness receiving means notifies both the buyer and seller of the confirmation.

4. A witness system according to claim 1, wherein the storing in memory of said documents according to said memory means is undertaken with respect to each buyer and each seller.

5. An account settlement system, comprising:
    notarization document making means for making a notarization document by a buyer for each one of a plurality of seller records sent from a seller to the buyer after at least one sale operation has been agreed upon when an offer and an acceptance have occurred, each seller record including sales data about one or more items sold by the seller to the buyer, the buyer making each notarization document upon receipt of each seller record, and each notarization document indicating a selected sale and corresponding sales data of at least one item among the plurality of seller records;
    sending means for sending to a notarization authority each notarization from the buyer after the buyer makes each notarization document, and for sending each notarization document from the notarization authority to the seller;
    confirmation means for confirming by the seller whether the contents of each seller record is in agreement with the contents of a corresponding one of the notification documents;
    a witness having the notarization authority and certifying that each notification document is accurate after the seller confirms that each seller record agrees with the corresponding notarization document;
    memory means for storing in a memory the notarization documents certified by said witness;
    detailed payment statement making means for making, with reference to the notarization documents stored in the memory, a detailed payment statement, upon which payment to the seller by the buyer is to be based;
    funds transfer request means for requesting a transfer of funds, based on the detailed payment statement; and
    notification means for notifying said witness of a transfer of funds, when funds are transferred to the seller based on the funds transfer request, and
    wherein the witness responds to any subsequent inquiry of the buyer or the seller relative to the selected sale using the stored confirmation documents,
    said detailed payment statement is made in accordance with payment terms and said payment terms are managed by said witness system.

6. An account settlement system using a witness system according to claim 5, wherein said seller checks said detailed payment statement against documents stored in memory according to said memory means.

7. An account settlement system utilizing a witness system according to claim 5, wherein making of said detailed payment statement is undertaken by said buyer.

8. An account settlement system utilizing a witness system according to claim 5, wherein making of said detailed payment statement is undertaken by said witness.

9. An account settlement system utilizing a witness system according to claim 8, wherein said buyer checks said detailed payment statement in accordance with documents stored in memory according to said memory means.

10. An account settlement system utilizing the witness system according to claim 5, wherein when said witness system notarizes notarization documents, notification of said notarization is given to both the buyer and seller.

11. An account settlement system utilizing a witness system, comprising:
   notarization document making means for making a notarization document by a seller for each one of a plurality of buyer records sent from a buyer to the seller, each buyer record including sales data about one or more items sold by the buyer to the seller, the seller making each notarization document upon receipt of each buyer record, and each notarization document indicating a sale and corresponding sales data of at least one item among the plurality of seller records;
   sending means for sending to a notarization authority each notarization from the seller after the seller makes each notarization document, and for sending each notarization document from the notarization authority to the buyer;
   confirmation means for confirming by the buyer whether the contents of each buyer record is in agreement with the contents of a corresponding one of the notification documents;
   a witness having the notarization authority and certifying that each notification document is accurate after the buyer confirms that each buyer record agrees with the corresponding notarization document;
   memory means for storing in a memory the notarization documents certified by said witness;
   detailed payment statement making means for making, by said buyer, with reference to the notarization documents stored in the memory, a detailed payment statement upon which a set-off payment by the seller to the buyer is based; and
   request means for requesting a financial institution to issue a check to the buyer, based on the detailed a payment statement, wherein said detailed a payment statement is made in accordance with payment terms and said payment terms are managed by said witness system.

12. An account settlement system utilizing the witness system according to claim 11, wherein said financial institution notifies said witness when a check is issued based on said check issue request.

13. An account settlement system utilizing a witness system, comprising:
   notarization document making means for making a notarization document by a buyer for each one of a plurality of seller records sent from a seller to the buyer, each seller record including sales data about one or more items sold by the seller to the buyer, the buyer making each notarization document upon receipt of each seller record, and each notarization document indicating a selected sale and corresponding sales data of at least one item among the plurality of seller records;
   sending means for sending to a notarization authority each notarization from the buyer after the buyer makes each notarization document, and for sending each notarization document from the notarization authority to the seller;
   confirmation means for confirming by the seller whether the contents of each seller record is in agreement with the contents of a corresponding one of the notification documents;
   a witness having the notarization authority and certifying that each notification document is accurate after the seller confirms that each seller record agrees with the corresponding notarization document;
   memory means for storing in a memory the notarization documents certified by said witness;
   detailed payment statement making means for making, with reference to the notarization documents stored in the memory, a detailed payment statement, upon which payment to the seller by the buyer is to be based; and
   request means for requesting a financial institution to issue a note to the buyer, said detailed payment statement is made in accordance with payment terms and said payment terms are managed by said witness system.

14. An account settlement system utilizing a witness system according to t claim 13, wherein said witness is notified when said financial institution has issued a note based on said note issuance request.

15. An account settlement system according to claim 5, wherein at the time said detailed payment statement is made, set-off processing is performed when said buyer is possessed of a receivable against said seller.

16. A witness system according to claim 1, wherein said witness receiving means confirms in advance a buyer and a seller and utilizes an authentication certificate when performing any procedure.

17. An account settlement system utilizing said witness system according to claim 5, wherein said witness confirms in advance a buyer and a seller and utilizes an authentication certificate when performing any procedure.

18. A witness system according to claim 1, wherein data transmitted among said witness receiving means, buyer, and seller, are encoded.

19. An account settlement system utilizing said witness system according to claim 5, wherein data transmitted among said witness, buyer, and seller, are encoded.

20. A witness system according to claim 16, wherein said witness receiving means notarizes said transmitted data.

21. A method for document confirmation by a witness system, comprising:
   making a confirmatory document by a buyer for each one of a plurality of seller records sent from a seller to the buyer, each seller record including sales data about one or more items sold by the seller to the buyer, the buyer making each confirmatory document upon receipt of each seller record, and each confirmatory document indicating a selected sale and corresponding sales data of at least one item among the plurality of seller records;
   sending to a witness each confirmatory document from the buyer after the buyer makes each confirmatory document, and sending each confirmatory document from the witness to the seller;
   confirming by the seller whether the contents of each seller record are in agreement with the contents of a corresponding one of the confirmatory documents;
   certifying, by the witness, that each confirmatory document is accurate, and notifying the buyer and the seller of each certification; and storing the certified documents in a memory, when said confirmation documents are sent from said seller to said witness receiving means, said documents are registered and the fact that said documents are registered is confirmed, and when said contents do not agree, as determined according to said confirmation means, said witness receiving means is notified of the substantive disagreement.

22. An account settlement method utilizing a witness system, comprising:

making a notarization document by a buyer for each one of a plurality of seller records sent periodically from a seller to the buyer, each seller record including sales data about one or more items sold by the seller to the buyer, the buyer making each notarization document upon receipt of each seller record, and each notarization document indicating a selected sale and corresponding sates data of at least one item among the plurality of seller records;

sending to a notarization authority each notarization document from the buyer after the buyer makes each notarization document, and sending each notarization document from the notarization authority to the seller;

confirming by the seller whether the contents of each seller record are in agreement with the contents of a corresponding one of the notarization documents;

notarizing, by a witness having the notarization authority, that each document is accurate and notifying the buyer and the seller of each notarization, after the seller confirms that each seller record agrees with the corresponding notarization document;

storing in a memory the notarized documents;

making, with reference to the stored notarization documents, a detailed payment statement upon which is based payment by the buyer to the seller; and requesting the transfer of funds to the seller, based on the detailed payment statement, wherein said detailed payment statement is made in accordance with payment terms and said payment terms are managed by said witness system.

23. A computer-readable memory medium containing a program causing a computer to execute document confirmation processes performed by a witness system, and comprising a process of:

making a confirmatory document by a buyer for each one of a plurality of seller records sent from a seller to the buyer, each seller record including sales data about one or more items sold by the seller to the buyer, the buyer making each confirmatory document upon receipt of each seller record, and each confirmatory document indicating a selected sale and corresponding sales data of at least one item among the plurality of seller records;

sending, to a witness, each confirmatory document from the buyer after the buyer makes each confirmatory document, and sending each confirmatory document from the witness to the seller;

confirming by the seller whether the contents of each seller record are in agreement with the contents of a corresponding one of the confirmatory documents;

certifying by the witness that each confirmatory document is accurate, and notifying the buyer and the seller of each certification, after the seller confirms that each seller record agrees with the corresponding confirmatory document; and storing in a memory each certified document, wherein when said confirmation documents are sent from said seller to said witness receiving means, said documents are registered and the fact that said documents are registered is confirmed, and when said contents do not agree, as determined according to said confirmation means, said witness receiving means is notified of the substantive disagreement.

24. A computer-readable memory medium containing a program causing a computer to execute an account settlement process using a witness system, and comprising a process of:

making a notarization document by a buyer for each one of a plurality of seller records sent from a seller to the buyer, each seller record including sales data about one or more items sold by the seller to the buyer, the buyer making each notarization document upon receipt of each seller record, and each notarization document indicating a selected sale and corresponding sales data of at least one item among the plurality of seller records;

sending, to a notarization authority, each notarization document from the buyer after the buyer makes each notarization document, and sending each notarization document from the notarization authority to the seller;

confirming, by the seller, whether the contents of each seller record and the contents of a corresponding one of the notarization documents are in agreement;

notarizing, by a witness having the notarization authority, that each notarization document is accurate, and notifying the buyer and the seller of each notarization, after the seller confirms that each seller record agrees with the corresponding notarization document;

storing, in a memory, the notarized documents;

making, with reference to the notarized documents, a detailed payment statement upon which is based payment by the buyer to the seller; and requesting that funds be transferred to the seller, based on the detailed payment statement, wherein said detailed payment statement is made in accordance with payment terms and said payment terms are managed by said witness system.

* * * * *